(12) United States Patent
Nakamura et al.

(45) Date of Patent: Mar. 3, 2020
(10) Patent No.: US 10,576,757 B2

(54) DRYER, LIQUID DISCHARGE APPARATUS, DRYING METHOD, AND INKJET RECORDING APPARATUS

(71) Applicants: Takuma Nakamura, Kanagawa (JP); Naohiro Toda, Kanagawa (JP); Hiroyuki Yamashita, Kanagawa (JP); Masaya Hamaguchi, Kanagawa (JP); Yukie Inoue, Kanagawa (JP)

(72) Inventors: Takuma Nakamura, Kanagawa (JP); Naohiro Toda, Kanagawa (JP); Hiroyuki Yamashita, Kanagawa (JP); Masaya Hamaguchi, Kanagawa (JP); Yukie Inoue, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/299,016

(22) Filed: Mar. 11, 2019

(65) Prior Publication Data
US 2019/0283459 A1  Sep. 19, 2019

(30) Foreign Application Priority Data
Mar. 16, 2018 (JP) .................................. 2018-050057
Mar. 1, 2019 (JP) .................................. 2019-037950

(51) Int. Cl.
*B41J 11/00* (2006.01)
*B41J 2/21* (2006.01)
*C09D 11/00* (2014.01)

(52) U.S. Cl.
CPC ........... *B41J 11/002* (2013.01); *B41J 2/2103* (2013.01); *B41J 2/2117* (2013.01); *B41J 11/0015* (2013.01); *C09D 11/00* (2013.01); *B41J 2202/21* (2013.01)

(58) Field of Classification Search
CPC ..... B41J 11/002; B41J 2/2117; B41J 11/0015; B41J 2/2103; B41J 2202/21; C09D 11/00; C09D 11/10; C09D 11/322
See application file for complete search history.

(56) References Cited

U.S. PATENT DOCUMENTS

| | | | |
|---|---|---|---|
| 8,955,956 B2* | 2/2015 | Yamamoto et al. | B41J 2/01 347/102 |
| 9,327,524 B1 | 5/2016 | Yamada et al. | |
| 2014/0267520 A1* | 9/2014 | Toda et al. | 347/2 |
| 2015/0165787 A1 | 6/2015 | Fujii et al. | |

(Continued)

FOREIGN PATENT DOCUMENTS

| | | |
|---|---|---|
| JP | 2009-279870 | 12/2009 |
| JP | 2009-285877 | 12/2009 |

(Continued)

*Primary Examiner* — Henok D Legesse
(74) *Attorney, Agent, or Firm* — Duft & Bornsen, PC

(57) ABSTRACT

A dryer includes a conveyor to convey a film including a first surface onto which a liquid is applied, a noncontact heater to heat the first surface of the film conveyed by the conveyor without contacting the first surface, a contact heater to contact and heat a second surface of the film opposite the first surface, and circuitry to set a first heating temperature of the contact heater less than 85° C. and set a second heating temperature of the noncontact heater to be 30° C. to 90° C. higher than the first heating temperature.

20 Claims, 27 Drawing Sheets

(56) References Cited

U.S. PATENT DOCUMENTS

| | | | |
|---|---|---|---|
| 2015/0258783 A1* | 9/2015 | Toda et al. | B41J 2/14 347/2 |
| 2015/0329731 A1 | 11/2015 | Fujii et al. | |
| 2016/0114600 A1 | 4/2016 | Yamada et al. | |
| 2017/0066254 A1 | 3/2017 | Inoue et al. | |

FOREIGN PATENT DOCUMENTS

| | | |
|---|---|---|
| JP | 2011-201230 | 10/2011 |
| JP | 2012-045764 | 3/2012 |
| JP | 2012-076227 | 4/2012 |
| JP | 2013-047136 | 3/2013 |
| JP | 2014-238191 | 12/2014 |
| JP | 2015-085568 | 5/2015 |

* cited by examiner

FIG. 18

| COLOR INK | BLACK INK B1 | CYAN INK C1 | MAGENTA INK M1 | YELLOW INK Y1 |
|---|---|---|---|---|
| BLACK PIGMENT DISPERSION | 15 | | | |
| CYAN PIGMENT DISPERSION | | 15 | | |
| MAGENTA PIGMENT DISPERSION | | | 15 | |
| YELLOW PIGMENT DISPERSION | | | | 15 |
| RESIN EMULSION | 8.5 | 8.5 | 8.5 | 8.5 |
| SURFACTANT | 2 | 2 | 2 | 2 |
| ANTISEPTIC | 0.1 | 0.1 | 0.1 | 0.1 |
| 1,2-PROPANEDIOL | 30 | 30 | 30 | 30 |
| 3-METHYL-1,3-BUTANEDIOL | 10 | 10 | 10 | 10 |
| ION-EXCHANGE WATER | 34.4 | 34.4 | 34.4 | 34.4 |
| TOTAL | 100 | 100 | 100 | 100 |

FIG. 19

| COLOR INK | BLACK INK B2 | CYAN INK C2 | MAGENTA INK M2 | YELLOW INK Y2 |
|---|---|---|---|---|
| BLACK PIGMENT DISPERSION | 15 | | | |
| CYAN PIGMENT DISPERSION | | 15 | | |
| MAGENTA PIGMENT DISPERSION | | | 15 | |
| YELLOW PIGMENT DISPERSION | | | | 15 |
| RESIN EMULSION | 8.5 | 8.5 | 8.5 | 8.5 |
| SURFACTANT | 2 | 2 | 2 | 2 |
| ANTISEPTIC | 0.1 | 0.1 | 0.1 | 0.1 |
| 1,2-PROPANEDIOL | 35 | 35 | 35 | 35 |
| 3-METHYL-1,3-BUTANEDIOL | 15 | 15 | 15 | 15 |
| ION-EXCHANGE WATER | 24.4 | 24.4 | 24.4 | 24.4 |
| TOTAL | 100 | 100 | 100 | 100 |

FIG. 20

| WHITE INK | W1 | W2 | W3 | W4 |
|---|---|---|---|---|
| WHITE PIGMENT DISPERSION | 40 | 40 | 40 | 40 |
| RESIN EMULSION | 3.5 | 3.5 | 3.5 | 3.5 |
| SURFACTANT | 2 | 2 | 2 | 2 |
| ANTISEPTIC | 0.1 | 0.1 | 0.1 | 0.1 |
| 1,2-PROPANEDIOL | 25 | 20 | 30 | 35 |
| 3-METHYL-1,3-BUTANEDIOL | 7 | 5 | 10 | 15 |
| ION-EXCHANGE WATER | 22.4 | 29.4 | 14.4 | 4.4 |
| TOTAL | 100 | 100 | 100 | 100 |

FIG. 21

| | PRINTER | PRE-COATING LIQUID | INK | | DRYER | | | |
|---|---|---|---|---|---|---|---|---|
| | | | COLOR INK | WHITE INK | DRYER BEFORE WHITE PRINTING | INK DRYER 1 | INK DRYER 2 | INK DRYER 3 |
| EXAMPLE 1 | FIG. 11 | P1 | B1/C1/M1/Y1 | W2 | NONE | HOT-AIR TEMPERATURE 80 °C | DRUM TEMPERATURE 70 °C HOT-AIR TEMPERATURE 130 °C | NONE |
| EXAMPLE 2 | FIG. 12 | P1 | B1/C1/M1/Y1 | W2 | NONE | HOT-AIR TEMPERATURE 80 °C | DRUM TEMPERATURE 70 °C HOT-AIR TEMPERATURE 130 °C | |
| EXAMPLE 3 | FIG. 11 | P1 | B1/C1/M1/Y1 | W1 | NONE | HOT-AIR TEMPERATURE 80 °C | DRUM TEMPERATURE 70 °C HOT-AIR TEMPERATURE 130 °C | NONE |
| EXAMPLE 4 | FIG. 11 | P1 | B2/C2/M2/Y2 | W1 | NONE | HOT-AIR TEMPERATURE 80 °C | DRUM TEMPERATURE 70 °C HOT-AIR TEMPERATURE 130 °C | NONE |
| EXAMPLE 5 | FIG. 11 | P1 | B2/C2/M2/Y2 | W3 | NONE | HOT-AIR TEMPERATURE 80 °C | DRUM TEMPERATURE 70 °C HOT-AIR TEMPERATURE 130 °C | NONE |
| EXAMPLE 6 | FIG. 11 | P1 | B1/C1/M1/Y1 | W2 | NONE | HOT-AIR TEMPERATURE 80 °C | DRUM TEMPERATURE 70 °C HOT-AIR TEMPERATURE 100 °C | NONE |
| EXAMPLE 7 | FIG. 11 | P1 | B1/C1/M1/Y1 | W2 | NONE | HOT-AIR TEMPERATURE 80 °C | DRUM TEMPERATURE 70 °C HOT-AIR TEMPERATURE 115 °C | NONE |
| EXAMPLE 8 | FIG. 11 | P1 | B1/C1/M1/Y1 | W2 | NONE | HOT-AIR TEMPERATURE 80 °C | DRUM TEMPERATURE 70 °C HOT-AIR TEMPERATURE 145 °C | NONE |
| EXAMPLE 9 | FIG. 11 | P1 | B1/C1/M1/Y1 | W2 | NONE | HOT-AIR TEMPERATURE 80 °C | DRUM TEMPERATURE 70 °C HOT-AIR TEMPERATURE 160 °C | NONE |
| EXAMPLE 10 | FIG. 11 | P1 | B1/C1/M1/Y1 | W2 | NONE | HOT-AIR TEMPERATURE 95 °C | DRUM TEMPERATURE 70 °C HOT-AIR TEMPERATURE 130 °C | NONE |
| EXAMPLE 11 | FIG. 13 | P1 | B1/C1/M1/Y1 | W2 | NONE | HOT-AIR TEMPERATURE 80 °C INFRARED HEATER 4W/cm² (ALTERNATELY ARRANGED) | DRUM TEMPERATURE 70 °C HOT-AIR TEMPERATURE 130 °C | NONE |
| EXAMPLE 12 | FIG. 14 | P1 | B1/C1/M1/Y1 | W2 | NONE | HOT-AIR TEMPERATURE 80 °C INFRARED HEATER 4W/cm² (ARRANGED SIDE BY SIDE) | DRUM TEMPERATURE 70 °C HOT-AIR TEMPERATURE 130 °C | NONE |
| EXAMPLE 13 | FIG. 15 | P1 | B1/C1/M1/Y1 | W2 | HOT-AIR TEMPERATURE 80 °C | HOT-AIR TEMPERATURE 80 °C | DRUM TEMPERATURE 70 °C HOT-AIR TEMPERATURE 130 °C | NONE |
| EXAMPLE 14 | FIG. 11 | P2 | B1/C1/M1/Y1 | W2 | NONE | HOT-AIR TEMPERATURE 80 °C | DRUM TEMPERATURE 70 °C HOT-AIR TEMPERATURE 130 °C | NONE |
| EXAMPLE 15 | FIG. 11 | P3 | B1/C1/M1/Y1 | W2 | NONE | HOT-AIR TEMPERATURE 80 °C | DRUM TEMPERATURE 70 °C HOT-AIR TEMPERATURE 130 °C | NONE |
| EXAMPLE 16 | FIG. 11 | P4 | B1/C1/M1/Y1 | W2 | NONE | HOT-AIR TEMPERATURE 80 °C | DRUM TEMPERATURE 70 °C HOT-AIR TEMPERATURE 130 °C | NONE |
| EXAMPLE 17 | FIG. 11 | NONE | B1/C1/M1/Y1 | W2 | NONE | HOT-AIR TEMPERATURE 80 °C | DRUM TEMPERATURE 70 °C HOT-AIR TEMPERATURE 130 °C | NONE |
| EXAMPLE 18 | FIG. 16 | P1 | B1/C1/M1/Y1 | W2 | NONE | DRUM TEMPERATURE 70 °C HOT-AIR TEMPERATURE 80 °C | DRUM TEMPERATURE 70 °C HOT-AIR TEMPERATURE 130 °C | NONE |
| EXAMPLE 20 | FIG. 11 | P1 | B1/C1/M1/Y1 | W4 | NONE | HOT-AIR TEMPERATURE 80 °C | DRUM TEMPERATURE 70 °C HOT-AIR TEMPERATURE 130 °C | NONE |
| EXAMPLE 21 | FIG. 11 | P1 | B2/C2/M2/Y2 | W4 | NONE | HOT-AIR TEMPERATURE 80 °C | DRUM TEMPERATURE 70 °C HOT-AIR TEMPERATURE 130 °C | NONE |
| COMPARATIVE EXAMPLE 6 | FIG. 11 | P1 | B1/C1/M1/Y1 | W2 | NONE | HOT-AIR TEMPERATURE 80 °C | DRUM TEMPERATURE 70 °C HOT-AIR TEMPERATURE 90 °C | NONE |
| COMPARATIVE EXAMPLE 7 | FIG. 11 | P1 | B1/C1/M1/Y1 | W2 | NONE | HOT-AIR TEMPERATURE 80 °C | DRUM TEMPERATURE 70 °C HOT-AIR TEMPERATURE 170 °C | NONE |
| EXAMPLE 22 | FIG. 11 | P1 | B1/C1/M1/Y1 | W2 | NONE | HOT-AIR TEMPERATURE 130 °C | DRUM TEMPERATURE 70 °C HOT-AIR TEMPERATURE 130 °C | NONE |
| EXAMPLE 23 | FIG. 11 | P1 | B1/C1/M1/Y1 | W2 | NONE | HOT-AIR TEMPERATURE 100 °C | DRUM TEMPERATURE 70 °C HOT-AIR TEMPERATURE 100 °C | NONE |

FIG. 22

| | FILM QUALITY | DRY QUALITY | LAMINATION STRENGTH |
|---|---|---|---|
| EXAMPLE 1 | A | A | A |
| EXAMPLE 2 | A | A | A |
| EXAMPLE 3 | A | A | A |
| EXAMPLE 4 | A | A | A |
| EXAMPLE 5 | A | B | B |
| EXAMPLE 6 | A | B | A |
| EXAMPLE 7 | A | A | A |
| EXAMPLE 8 | A | A | A |
| EXAMPLE 9 | B | A | A |
| EXAMPLE 10 | B | A | A |
| EXAMPLE 11 | A | A | A |
| EXAMPLE 12 | B | A | A |
| EXAMPLE 13 | A | A | B |
| EXAMPLE 14 | A | A | A |
| EXAMPLE 15 | A | A | B |
| EXAMPLE 16 | A | A | B |
| EXAMPLE 17 | A | A | C |
| EXAMPLE 18 | A | A | C |
| EXAMPLE 19 | A | C | C |
| EXAMPLE 20 | A | C | C |
| EXAMPLE 21 | A | C | C |
| COMPARATIVE EXAMPLE 6 | A | C | D |
| COMPARATIVE EXAMPLE 7 | D | A | A |
| EXAMPLE 22 | C | A | C |
| EXAMPLE 23 | C | A | A |

FIG. 31

| | PRINTER | DRYER | | | | | | | | FILM QUALITY | DRY QUALITY | LAMINATION STRENGTH |
|---|---|---|---|---|---|---|---|---|---|---|---|---|
| | | OPENING WIDTH | TEMPERATURE DIFFERENCE BETWEEN NOZZLE AND DRUM | SPEED OF HOT-AIR FROM NOZZLE | TEMPERATURE DETECTOR | GAP BETWEEN NOZZLE AND DRUM | DISTANCE BETWEEN NOZZLES | DRYER BETWEEN COLOR PRINTING AND WHITE PRINTING | | | |
| EXAMPLE 24 | FIG. 27 | 5mm | 30°C | 50m/s | 2 | 5mm | 30mm | NONE | A | B | A |
| EXAMPLE 26 | FIG. 27 | 6mm | 30°C | 50m/s | 2 | 5mm | 30mm | NONE | A | A | A |
| EXAMPLE 27 | FIG. 27 | 20mm | 30°C | 50m/s | 2 | 5mm | 30mm | NONE | A | B | A |
| EXAMPLE 29 | FIG. 27 | 5mm | 30°C | 40m/s | 2 | 5mm | 30mm | NONE | A | A | A |
| EXAMPLE 30 | FIG. 27 | 5mm | 30°C | 5m/s | 2 | 5mm | 30mm | NONE | A | B | A |
| EXAMPLE 31 | FIG. 27 | 5mm | 30°C | 50m/s | 1 | 5mm | 30mm | NONE | B | B | B |
| EXAMPLE 32 | FIG. 27 | 5mm | 30°C | 50m/s | 6 | 5mm | 30mm | NONE | A | A | A |
| EXAMPLE 33 | FIG. 27 | 5mm | 30°C | 50m/s | 2 | 10mm | 30mm | NONE | B | B | A |
| EXAMPLE 34 | FIG. 27 | 5mm | 30°C | 50m/s | 2 | 30mm | 30mm | NONE | A | B | A |
| EXAMPLE 35 | FIG. 27 | 5mm | 30°C | 50m/s | 2 | 2mm | 30mm | NONE | B | A | B |
| EXAMPLE 36 | FIG. 27 | 5mm | 30°C | 50m/s | 2 | 40mm | 30mm | NONE | A | B | B |
| EXAMPLE 37 | FIG. 27 | 5mm | 30°C | 50m/s | 2 | 5mm | 200mm | NONE | A | A | A |
| EXAMPLE 38 | FIG. 27 | 5mm | 30°C | 50m/s | 2 | 5mm | 20mm | NONE | B | B | B |
| EXAMPLE 39 | FIG. 27 | 5mm | 30°C | 50m/s | 2 | 5mm | 250mm | NONE | A | A | A |
| EXAMPLE 40 | FIG. 30 | 5mm | 30°C | 50m/s | 2 | 5mm | 30mm | EQUIPPED | B | B | B |
| COMPARATIVE EXAMPLE 7 | FIG. 27 | 5mm | 0°C | 50m/s | 2 | 5mm | 30mm | NONE | D | A | C |
| EXAMPLE 41 | FIG. 28 | 5mm | 30°C | 50m/s | 2 | 5mm | 30mm | NONE | C | B | C |
| EXAMPLE 42 | FIG. 27 | 2mm | 30°C | 50m/s | 2 | 5mm | 30mm | NONE | A | C | C |
| EXAMPLE 43 | FIG. 27 | 30mm | 30°C | 50m/s | 2 | 5mm | 30mm | NONE | A | C | C |
| EXAMPLE 44 | FIG. 27 | 5mm | 30°C | 2m/s | 2 | 5mm | 30mm | NONE | A | C | C |
| EXAMPLE 45 | FIG. 27 | 5mm | 30°C | 60m/s | 2 | 5mm | 30mm | NONE | C | A | B |

# DRYER, LIQUID DISCHARGE APPARATUS, DRYING METHOD, AND INKJET RECORDING APPARATUS

CROSS-REFERENCE TO RELATED APPLICATIONS

This patent application is based on and claims priority pursuant to 35 U.S.C. § 119(a) to Japanese Patent Application No. 2018-050057, filed on Mar. 16, 2018, and Japanese Patent Application No. 2019-037950, filed on Mar. 1, 2019, in the Japan Patent Office, the entire disclosure of each of which is hereby incorporated by reference herein.

BACKGROUND

Technical Field

The present disclosure relates to a dryer, a liquid discharge apparatus, a drying method, and an inkjet recording apparatus.

Related Art

A liquid discharge apparatus such as a printer using a liquid discharge method have been widespread. Recently, use of liquid discharge apparatus expands in industrial applications such as posters and food packaging. Note that the liquid discharge method is a method in which a liquid such as an aqueous ink is discharged onto a recording medium to form an image or the like on a recording medium.

The liquid discharge apparatus has a difficulty to dry the liquid on the recording medium. Particularly, the recording medium may be stacked while the liquid on the surface is not completely dried in high-speed printing. Then, problems may occur such as peeling off of the image on the recording medium or the image bleeding-through the recording medium. To solve the above-described problem, a drying technique is used to dry a surface of a recording medium with a heater or the like before stacking the recording medium immediately after image formation.

SUMMARY

In an aspect of this disclosure, a novel dryer includes a conveyor to convey a film including a first surface onto which a liquid is applied, a noncontact heater to heat the first surface of the film conveyed by the conveyor without contacting the first surface, a contact heater to contact and heat a second surface of the film opposite the first surface, and circuitry to set a first heating temperature of the contact heater less than 85° C. and set a second heating temperature of the noncontact heater to be 30° C. to 90° C. higher than the first heating temperature.

In another aspect of this disclosure, an inkjet recording apparatus includes a conveyor to convey a film in a conveyance direction, a first application device to apply a color ink onto a film conveyed by the conveyor, a second application device to apply a white ink onto the film to which the color ink is applied by the first application device, a first dryer including a drum and a plurality of nozzles facing the drum to discharge hot air from the plurality of nozzles onto the film wound around the drum, a second dryer disposed upstream of the first dryer in the conveyance direction, the second dryer including a plurality of nozzles not facing a drum to discharge hot air from the plurality of nozzles onto the film, and circuitry to set a first temperature of the hot air discharged from the plurality of nozzles of the first dryer to be higher than a second temperature of the hot air discharged from the plurality of nozzles of the second dryer.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 18 is a table of an example of a formulation of color inks according to the present disclosure;

FIG. 19 is a table of another example of a formulation of color inks according to the present disclosure;

FIG. 20 is a table of an example of a formulation of white inks according to the present disclosure;

FIG. 21 is a table illustrating configurations of examples and comparative examples according to the present disclosure;

FIG. 22 is a table illustrating evaluation results of the examples and the comparative examples according to the present disclosure;

FIG. 31 is a table illustrating evaluation results of the examples and the comparative examples according to the present disclosure.

Figure 1:
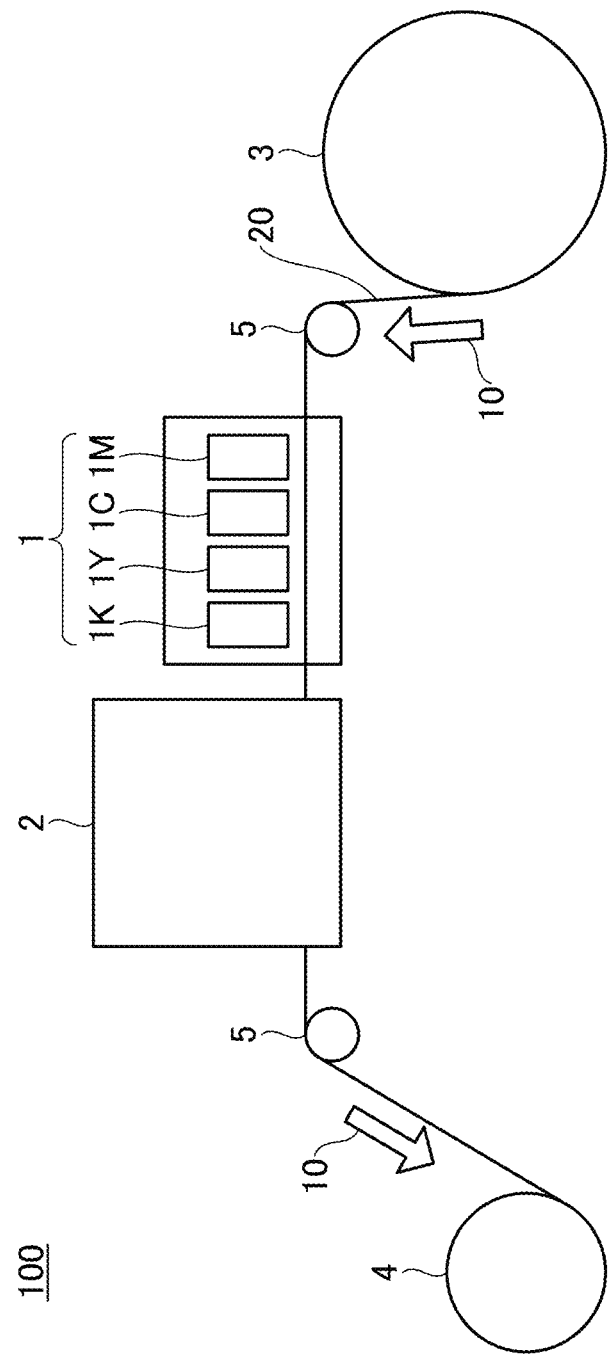
FIG. 1 is a side view of an example of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in an analogous manner, and achieve similar results.

Although the embodiments are described with technical limitations with reference to the attached drawings, such description is not intended to limit the scope of the disclosure and all the components or elements described in the embodiments of this disclosure are not necessarily indispensable. As used herein, the singular forms "a", "an", and "the" are intended to include the plural forms as well, unless the context clearly indicates otherwise.

Embodiments of the present disclosure are described in detail with reference to drawings. In each of the drawings, the same reference codes are allocated to components or portions having the same configuration and redundant descriptions of the same components may be omitted.

The terms "image formation", "recording", "printing", "image printing", and "molding" used in following embodiments of the present disclosure may be used synonymously with each other.

In the following embodiments of the present disclosure, the liquid discharge apparatus includes a liquid discharge head or a liquid discharge device and drives the liquid discharge head to discharge liquid. Hereinafter, the "liquid discharge head" is simply referred to as the "head". Note that "apparatus to discharge liquid" and "liquid discharge device" are synonymous.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink.

The above-described term "material on which liquid can be adhered" represents a material on which liquid is at least temporarily adhered, a material on which liquid is adhered and fixed, or a material into which liquid is adhered to permeate.

Further, the term "liquid" is not limited to a particular liquid and includes any liquid having a viscosity or a surface tension that can be discharged from the head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

The "liquid discharge apparatus" may be an apparatus to relatively move the head and a material on which liquid can be adhered. However, the liquid discharge apparatus is not limited to such an apparatus. For example, the liquid discharge apparatus may be a serial head apparatus that moves the head or a line head apparatus that does not move the head.

The "liquid discharge device" is an assembly of parts relating to liquid discharge. The term "liquid discharge device" represents a structure including the head and a functional part(s) or mechanism combined to the head to form a single unit. For example, the "liquid discharge device" includes a combination of the head with at least one of a head tank, a carriage, a supply unit, a maintenance unit, and a main scan moving unit.

Examples of the "single unit" include a combination in which the head and one or more functional parts and devices are secured to each other through, e.g., fastening, bonding, or engaging, and a combination in which one of the head and the functional parts and devices is movably held by another. The head may be detachably attached to the functional part(s) or unit(s) s each other.

For example, the head and the head tank may form the liquid discharge device as a single unit. Alternatively, the head and the head tank coupled (connected) with a tube or the like may form the liquid discharge device as a single unit. Here, a unit including a filter may further be added to a portion between the head tank and the head.

In another example, the liquid discharge device may include the head and the carriage to form a single unit.

In still another example, the liquid discharge device includes the head movably held by a guide that forms part of a main scan moving unit, so that the head and the main scan moving unit form a single unit. The liquid discharge device may include the head, the carriage, and the main scan moving unit that form a single unit.

In still another example, a cap that forms part of the maintenance unit is secured to the carriage mounting the head so that the head, the carriage, and the maintenance unit form a single unit to form the liquid discharge device.

Further, in still another example, the liquid discharge device includes tubes connected to the head tank or the head mounting a channel member so that the head and a supply unit form a single unit. Through this tube, the liquid in the liquid storage source such as an ink cartridge is supplied to the head.

The main scan moving unit may be a guide only. The supply unit may be a tube(s) only or a loading unit only.

The term "liquid discharge head" used herein is a functional component to discharge or jet liquid from nozzles.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

First Embodiment

Following describes a first embodiment in which an image forming apparatus using inkjet system is described as an example of a liquid discharge apparatus and a film is described as an example of "material on which liquid can be adhered". The term "film" is used in food packaging applications and the like, and is a thin film made of plastics such as polyethylene terephthalate as a material.

FIG. 1 is a side view of an example of an image forming apparatus according to the present disclosure. The image forming apparatus 100 includes a liquid discharge device 1, a dryer 2, a supply unit 3, an ejector 4, and a conveyor 5. The image forming apparatus 100 conveys a film 20 supplied from the supply unit 3 by the conveyor 5 along a conveyance direction 10 indicated by arrow in FIG. 1. Further, the image forming apparatus 100 discharges an ink onto the film 20 conveyed along the conveyance direction 10 from the liquid discharge device 1 to apply (adhere) the ink onto a surface of the film 20 to form an image on the surface of the film 20. The liquid discharge device 1 is an example of a liquid application device to apply liquid onto the film 20.

Here, the film 20 is, for example, a continuous film in a form of a roll that can be reeled. For example, the film 20 is a film used for soft packaging applications such as food packaging made of Oriented Poly-Propylene (OPP). The film 20 is an example of "a film made of oriented polypropylene as a material".

The liquid discharged from the liquid discharge device 1 is, for example, water-based ink. The aqueous ink is an ink mainly composed of a solvent and a coloring agent, and water is used as a solvent. Aqueous ink is an example of "aqueous liquid".

The liquid discharge device 1 includes a black head 1K, a yellow head 1Y, a cyan head 1C, and a magenta head 1M. The heads 1K to 1M discharge four liquids of black (K), yellow (Y), cyan (C), and magenta (M), respectively.

The image forming apparatus 100 according to the present disclosure includes the heads 1K to 1M of four colors of black (K), cyan (C), magenta (M) and yellow (Y). However, the present disclosure is not limited to the image forming apparatus 100 including four colors of heads 1K to 1M. For example, the image forming apparatus 100 may further include the heads that discharges inks of other colors such as green (G), red (R), light cyan (LC), for example. Further, the image forming apparatus 100 may include the head that discharges only black (K).

The supply unit 3 holds the film 20, onto which the liquid has not been discharged, and supplies the film 20 to the liquid discharge device 1. The film 20 is supplied from the supply unit 3 according to a progress of an image formation process by the liquid discharge device 1 and a drying process by the dryer 2. The supply unit 3 includes, for example, a supply roller around which the film 20 is wound, a motor for rotating the supply roller, and a controller to control the motor.

The dryer 2 dries the liquid discharged onto the film 20. The dryer 2 is separately described below.

The ejector 4 winds the dried film 20 dried by the dryer 2. The ejector 4 includes, for example, an ejection roller to wind the film 20, a motor to rotate the ejection roller, and a controller to control the motor.

The conveyor 5 transports the film 20 supplied from the supply unit 3 toward the liquid discharge device 1, the dryer 2, the ejector 4, and the like. The conveyor 5 includes a plurality of conveyance rollers including a driving roller and a driven roller, a motor to rotate the driving roller, a controller to control the motor, and a belt wound around the conveyance roller, for example.

Next, an example of a hardware configuration of the controller 200 of the image forming apparatus 100 according to the present disclosure is described with reference to the block diagram of FIG. 2.

Figure 2:
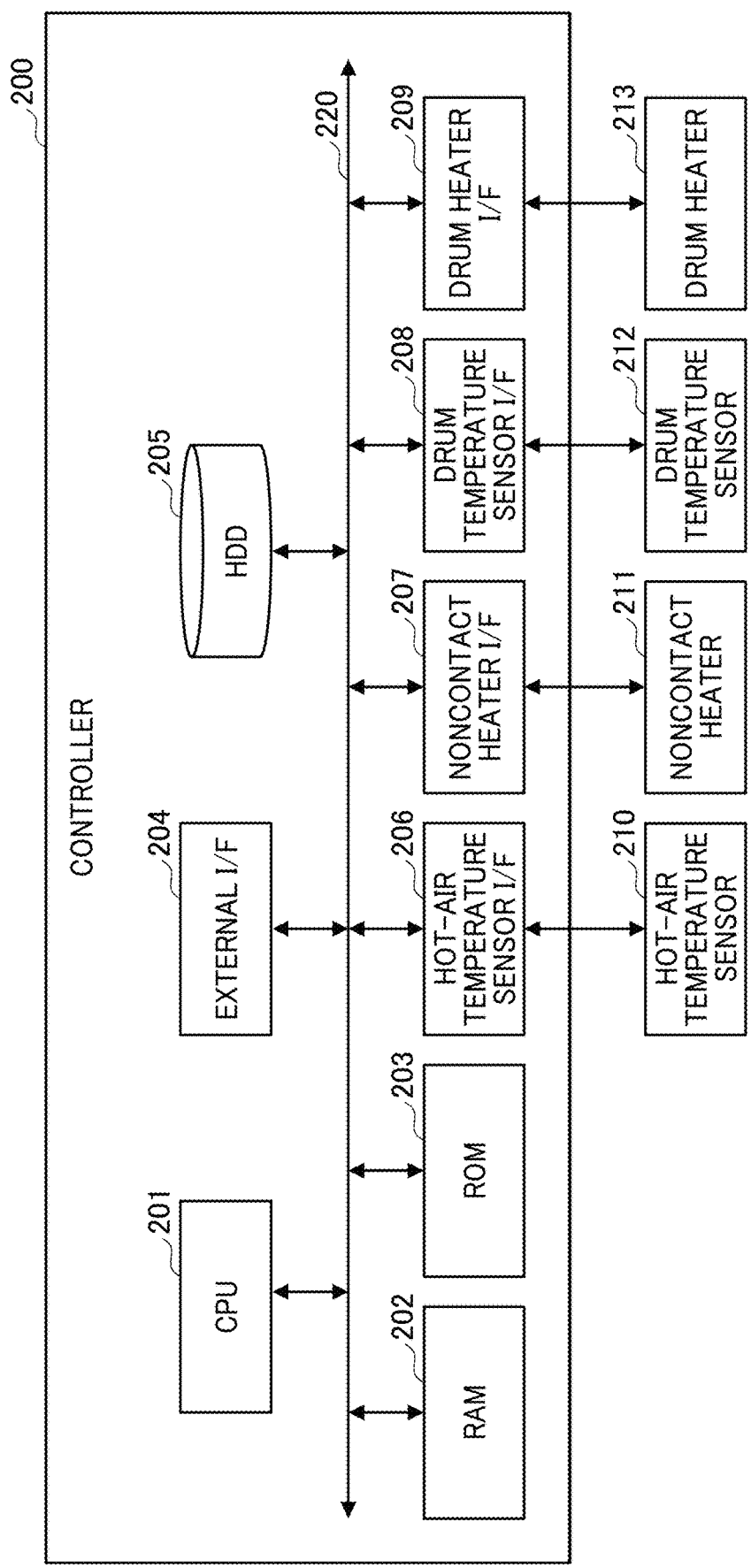
FIG. 2 is a block diagram illustrating an example of a hardware configuration of a controller of the image forming apparatus according to the first embodiment.

As illustrated in FIG. 2, the controller 200 includes a central processing unit (CPU) 201, a random-access memory (RAM) 202, a read only memory (ROM) 203, an external interface (I/F) 204, and a hard disk drive (HDD) 205. Further, the controller 200 includes a hot-air temperature sensor I/F 206, a noncontact heater I/F 207, a drum temperature sensor I/F 208, and a drum heater I/F 209. The above-described elements are connected with each other through a system bus 220.

The CPU 201 controls entire operation of the controller 200. The CPU 201 executes a program stored in the ROM 203, the HDD 205, or the like, using the RAM 202 as a work area. The CPU 201 thus controls the overall operation of the controller 200 and enables various functions described below. The external I/F 204 is an interface to connect an external device such as a Personal Computer (PC), a motor controller, and an external network to the image forming apparatus 100.

The controller 200 is connected to a hot-air temperature sensor 210, a noncontact heater 211, a drum temperature sensor 212, and a drum heater 213 via a hot-air temperature sensor I/F 206, a noncontact heater I/F 207, a drum temperature sensor interface (I/F) 208 and a drum heater I/F, respectively. Thus, the controller 200 can receive and send data or signals with the devices described above.

The hot-air temperature sensor 210 detects temperature of the hot air blown from the noncontact heater 211 and feeds back the temperature of the hot air to the controller 200 via the hot-air temperature sensor I/F 206. The drum temperature sensor 212 detects the temperature of the drum heater 213 and feeds back the temperature of the drum heater to the controller 200 via the drum temperature sensor I/F 208. The hot-air temperature sensor 210 and the drum temperature sensor 212 are, for example, noncontact type of a radiation thermometer or the like.

A part or all of the processes performed by the CPU 201 may be implemented by an electronic circuit (circuitry) such as a Field-Programmable Gate Array (FPGA) or an Application Specific Integrated Circuit (ASIC).

Further, the controller 200 may implement functions of the motor controller of the supply unit 3, the ejector 4, and the conveyor 5.

The controller 200 can implement the functional configuration described below with instructions given from the CPU 201 and the hardware configuration as illustrated in FIG. 2.

Figure 3:
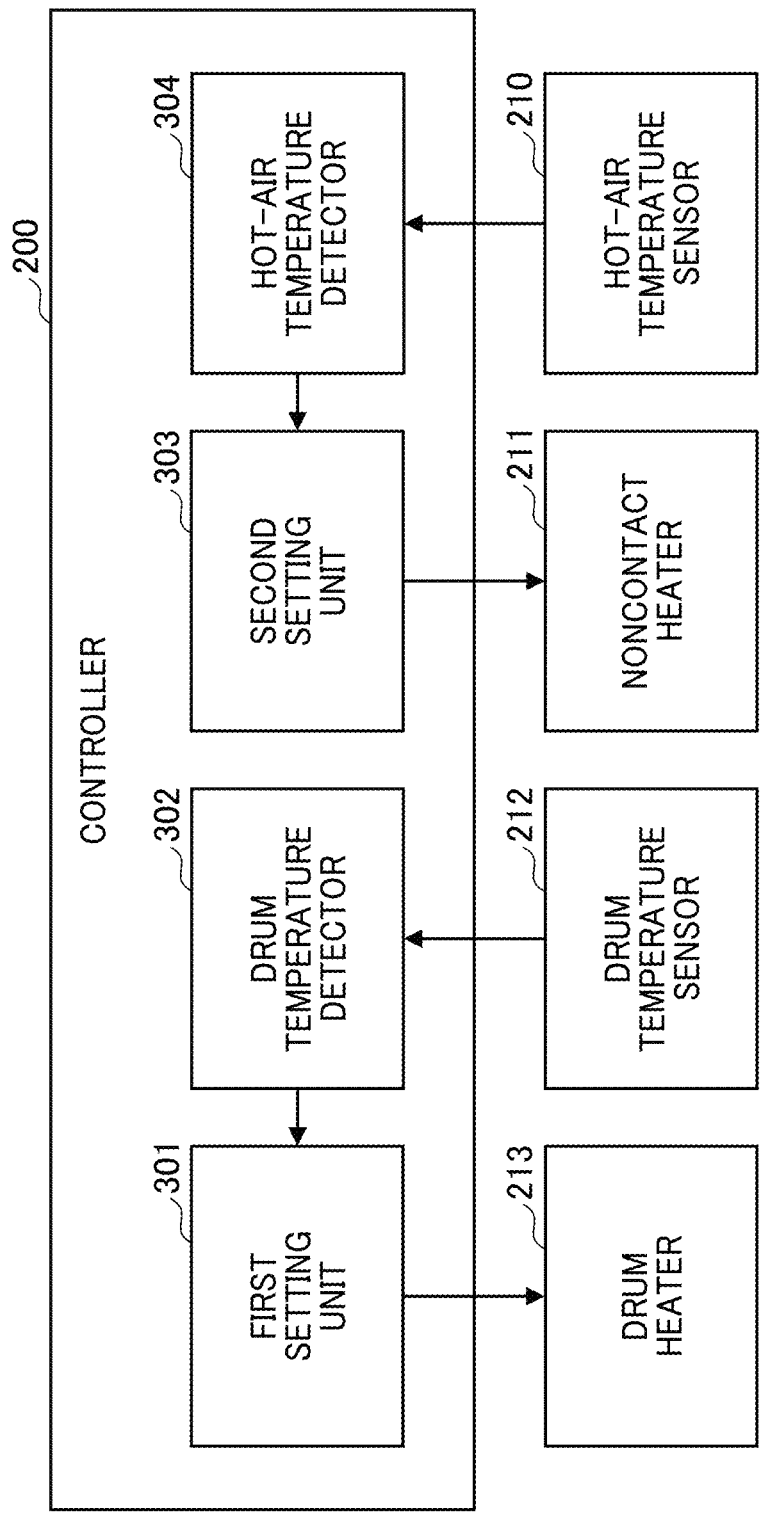
FIG. 3 is a block diagram illustrating an example of the functional configuration of the controller of the image forming apparatus according to the first embodiment.

FIG. 3 is a block diagram illustrating an example of the functional configuration of the controller 200 of the image forming apparatus 100 according to the present disclosure. The controller 200 includes a first setting unit 301, a drum temperature detector 302, a second setting unit 303, and a hot-air temperature detector 304. The first setting unit 301 is connected to the drum heater 213 and sets the temperature of the drum heater 213. The temperature of the drum heater 213 detected by the drum temperature sensor 212 is fed back to the first setting unit 301 via the drum temperature detector 302.

Functions executed by the controller 200 may be implemented by one or more processing circuits or circuitry. Processing circuitry includes a programmed processor, as a processor includes circuitry. A processing circuit also includes devices such as the central processing unit (CPU), an application specific integrated circuit (ASIC), digital signal processor (DSP), field programmable gate array (FPGA), and conventional circuit components arranged to perform the recited functions.

Further, the second setting unit 303 is connected to the noncontact heater 211. The second setting unit 303 sets the heating temperature of the noncontact heater 211. The noncontact heater 211 blows hot air such as heated air onto the film 20 to heat the film 20. The temperature of the hot air is detected by the hot-air temperature sensor 210, and the temperature is fed back to the second setting unit 303 via the hot-air temperature detector 304.

The CPU 201 reads data of the temperature stored in the HDD 205 or the like and sets the temperature of the drum heater 213 via the drum heater I/F 209 to implement a function of the first setting unit 301, for example. Alternatively, the CPU 201 may set the temperature of the drum heater 213 via the drum heater I/F 209 according to the data of temperature inputted from the drum temperature detector 302. The drum temperature sensor I/F 208 implements a function of the drum temperature detector 302, for example.

The CPU 201 reads data of the temperature stored in the HDD 205 or the like and sets the heating temperature of the noncontact heater 211 via the noncontact heater I/F 207 to implement a function of the second setting unit 303, for example. Alternatively, the CPU 201 may set the heating temperature of the noncontact heater 211 via the noncontact heater I/F 207 according to the data of temperature inputted from the hot-air temperature detector 304. The hot-air temperature sensor I/F 206 implements a function of the hot-air temperature detector 304, for example, The above-description illustrate an entire configuration of the image forming apparatus 100 according to the present disclosure. The following describes the dryer 2 of the image forming apparatus 100 according to the present disclosure in detail.

Figure 4:
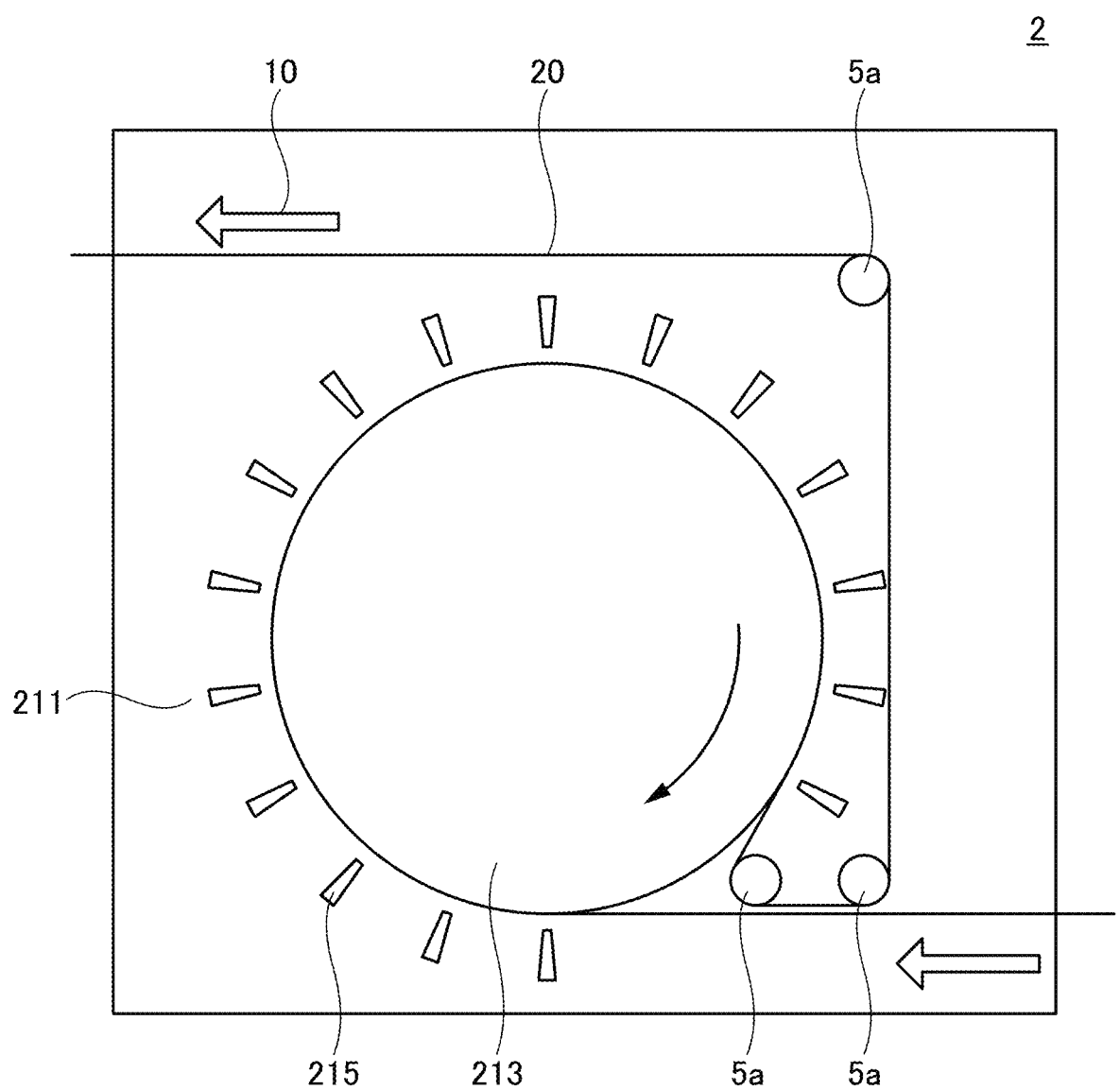
FIG. 4 is a side view of an example of a dryer according to the first embodiment.

FIG. 4 is a side view of an example of the dryer 2 in the image forming apparatus 100 according to the present disclosure. The dryer 2 includes the noncontact heater 211 and the drum heater 213. The dryer 2 further includes a conveyance roller 5a that is a part of the conveyor 5.

The drum heater 213 includes a heater incorporated in a rotatable cylindrical member. The black solid arrow in FIG. 4 indicate a direction of rotation of the drum heater 213. The film 20 is conveyed in a conveyance direction 10 indicated by arrow in FIG. 4 and is wound around the drum heater 213. The drum heater 213 is in contact with a back surface of the film 20 opposite the surface onto which the liquid is discharged.

The drum heater 213 transfers heat to the back surface of the film 20 conveyed by the conveyer 5 to heat the liquid discharged onto the film 20. If the drum heater 213 comes into contact with a liquid on the film 20 in an undried state for drying, the liquid on the surface of the film 20 may be disturbed that may damage the image on the film 20. However, the drum heater 213 according to the present disclosure transfers heat to the film 20 from the back surface of the film 20, and the drum heater 213 thus does not contact the liquid on the film 20 in an undried state. Thus, the drum heater 213 does not cause disturbance of the liquid and damage on the image on the film 20.

Conversely, the noncontact heater 211 includes a plurality of nozzles 215 and blows heated air at a predetermined wind speed through each of the plurality of nozzles 215. That is, the hot air (heated air) is blown onto the surface of the film 20 on which the liquid is discharged, that is, a front surface of the film 20. Thus, the noncontact heater 211 dries the undried liquid on the front surface of the film 20 with the hot air in a noncontact manner.

Since the noncontact heater 211 heats the film 20 without contacting the film 20, the noncontact heater 211 can dry the liquid discharged onto the film 20 without contacting the liquid to disturb the liquid on the film 20 and damage the image on the film 20. The front surface is an example of "a surface of a conveyed film onto which a liquid is discharged". The noncontact heater 211 is a typical example of "a noncontact heater that heats a front surface of a recording medium to be conveyed onto which a liquid is discharged without contacting the recording medium".

The drum heater 213 is a typical example of "a contact heater that contacts and heats a back surface of a recording medium opposite the front surface onto which the liquid is discharged". Further, the drum heater 213 is a typical example of "a cylindrical member around which a film is wound".

Figure 5:
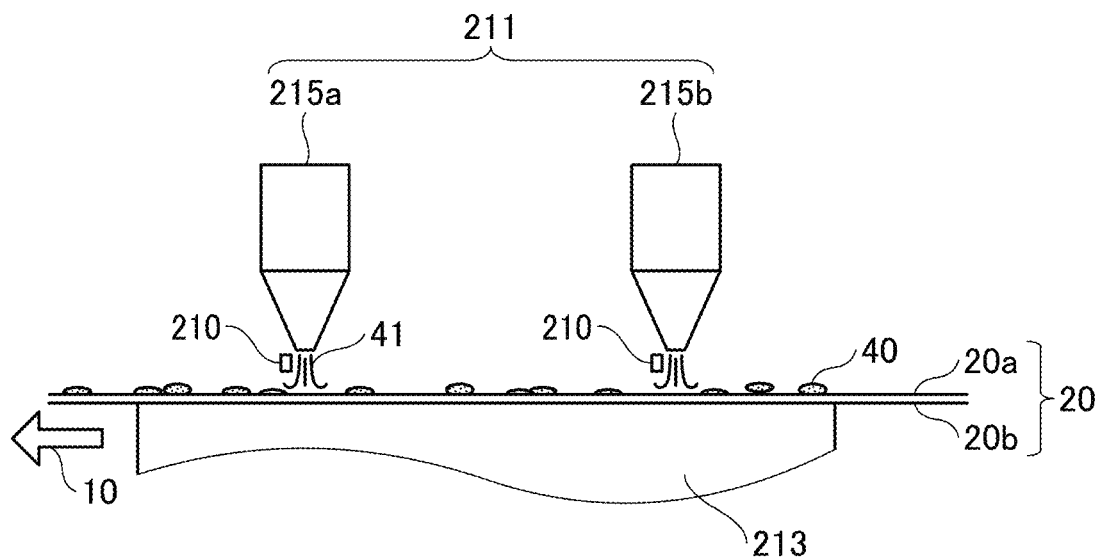
FIG. 5 is a side view of a noncontact heater of the dryer according to the first embodiment.

Next, FIG. 5 is an enlarged side view of the nozzles 215 of the noncontact heater 211 in the dryer 2.

As illustrated in FIG. 5, the liquid 40 discharged by the liquid discharge device 1 adheres to a front surface 20a of the film 20 conveyed along the conveyance direction 10. The nozzles 215a and 215b of the noncontact heater 211 are arranged to face the front surface 20a of the film 20. The nozzles 215a and 215b are part of the plurality of nozzles 215 of the noncontact heater 211. The noncontact heater 211 blows hot air 41 through the nozzles 215a and 215b onto the front surface 20a of the film 20.

A hot-air temperature sensor 210 is disposed in each of blowout portions located close to tips of the nozzles 215a and 215b. Thus, the hot-air temperature sensors 210 are hit by the hot air blown from the nozzles 215a and 215b. The hot-air temperature sensors 210 detect the temperature of the hot air blown from the nozzles 215a and 215b and feedback the detected temperature to the controller 200.

A distance between the nozzle 215a and the front surface 20a of the film 20 is 10 mm, for example. Similarly, a distance between the nozzle 215b and the front surface 20a of the film 20 is also 10 mm. Further, the hot-air temperature sensor 210 may detect the temperature of the hot air blown from all the nozzles 215 of the noncontact heater 211 or may detect the temperature of the hot air from a part of the nozzles 215.

Conversely, the back surface 20b of the film 20 contacts the drum heater 213 as described above, and heat is conducted from the drum heater 213 to the back surface 20b of the film 20.

Figure 6:
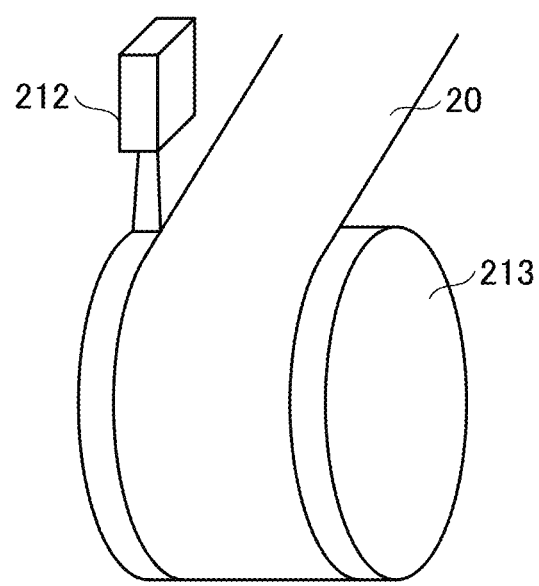
FIG. 6 is a perspective view of an example of a configuration to detect heating temperature of a drum heater of the dryer according to the first embodiment.

FIG. 6 is a perspective view of an example of a configuration to detect the heating temperature of the drum heater 213. As illustrated in FIG. 6, the drum temperature sensor 212 is disposed to detect the temperature of a portion (an edge portion in FIG. 6) of the drum heater 213 not in contact with the film 20. The drum temperature sensor 212 detects the temperature of the drum heater 213 and feeds the detected temperature back to the controller 200.

The position of the drum temperature sensor 212 is not limited to the example illustrated in FIG. 6. It is desirable to detect the temperature of a portion of a cylindrical surface of the drum heater 213 to which the film 20 is not wound. Thus, the drum temperature sensor 212 can detect the temperature irrespective of the presence of the film 20. The drum temperature sensor 212 is an example of "a temperature sensor that detects the temperature of a portion of a cylindrical surface of a cylindrical member on which the film is not wound".

Drying characteristics of the film 20 is described below. It is necessary to evaporate the water and the solvent contained in the liquid 40 to dry the liquid 40 adhered onto the film 20. Since the energy necessary for evaporating water is large, the dryer 2 is used to accelerate the drying of the liquid 40 in the present disclosure.

For example, if the recording medium onto which the liquid is adhered is a sheet of paper, the temperature at which the paper discolors by heat is about 140° C., and ignition temperature of the sheet of paper is 300° C. or higher. Thus, no problem occurs until the temperature reaches the temperatures as describe above. However, if the recording medium onto which the liquid is adhered is the film 20, the film 20 is weaker to heat than sheet of paper, and the film 20 may be deformed under the heat at about 100° C.

Figure 7:
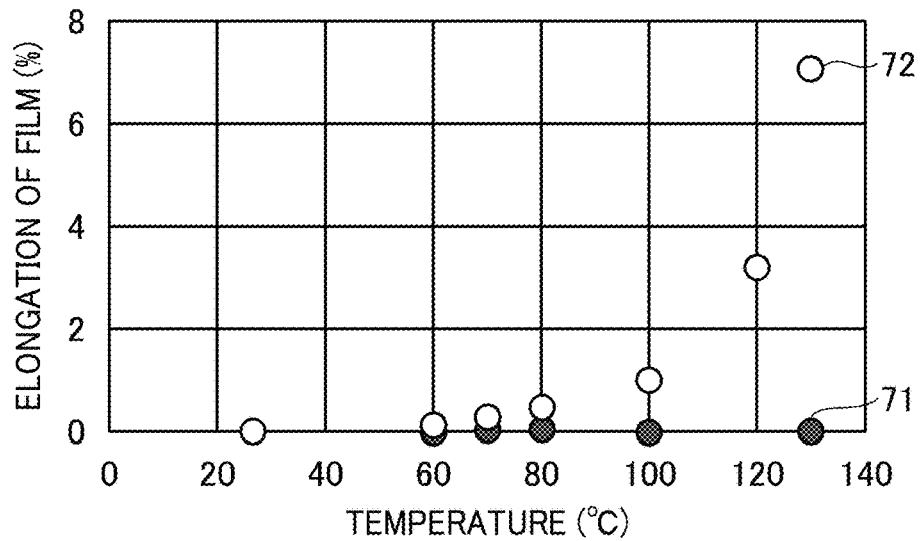
FIG. 7 is a graph illustrating an amount of deformation (elongation) of a film when the film is heated while tension necessary for conveyance is applied to the film.

FIG. 7 is a graph illustrating an amount of deformation (elongation) of the film 20 when the film 20 is heated while tension necessary for conveyance is applied to the film 20. In FIG. 7, the horizontal axis represents a heating temperature and a vertical axis represents the elongation of the film 20. The elongation of the film 20 is indicated by a ratio of an elongation from the original length of the film 20. Black circles 71 illustrate a film made of polyethylene terephthalate (PET) as a material, and a white circles 72 illustrate a film made of Oriented Poly-Propylene (OPP) as a material. Hereinafter, the film made of PET is referred to as a PET film, and a film made of OPP is referred to as an OPP film.

As illustrated in FIG. 7, the elongation of the PET film is small even when the heating temperature increases. However, the elongation of the OPP film sharply increases from the temperature exceeding 80° C. The elongation of 1% at 100° C. of the OPP film can be visually recognized. Further, the elongation of the OPP film is different for each place in the OPP film that causes wrinkles in the OPP film. Thus, when the elongation of the OPP film exceeds 1%, the OPP film becomes difficult to be used for practical applications such as food packaging.

Conversely, OPP films are often used conventionally as soft packaging films such as food packaging. Thus, it may not practical to remove OPP films from films used for the recording media for soft packaging. Thus, to practically use a film such as the OPP film, the heating temperature for drying the film 20 is set to be about 80° C. or less at which the elongation of the OPP film rapidly increases.

When the heating temperature is 80° C. or less, time for drying the liquid adhered to the film 20 to a state in which the film 20 can be wound around the ejector 4 is about 70 seconds, for example. When a speed of conveyance of the film 20 is 50 (m/s), a distance of the film 20 conveyed during the time (about 70 seconds) for drying the liquid adhered onto the film 20 is 58 m. The image forming apparatus 100 becomes large to secure such a conveyance distance. Thus, it is important to dry the film 20 at high-speed in a short time while preventing the elongation of the film 20.

The dryer 2 according to the present disclosure controls the first setting unit 301 to set the heating temperature of the drum heater 213 to less than 85° C. Further, the dryer 2 controls the second setting unit 303 to set the heating temperature of the noncontact heater 211 to be 140° C. or more and 160° C. or less that is 30° C. to 90° C. higher than the heating temperature of the drum heater 213.

The first setting unit 301 is an example of "a first setting unit to set heating temperature of a contact heater to be less than 85° C.". The second setting unit 303 is an example of "a second setting unit to set heating temperature of the noncontact heater 211 to be 140° C. or more and 160° C. or less and sets heating temperature of the noncontact heater 211 to be 30° C. to 90° C. higher than the heating temperature of the contact heater".

Figure 8:
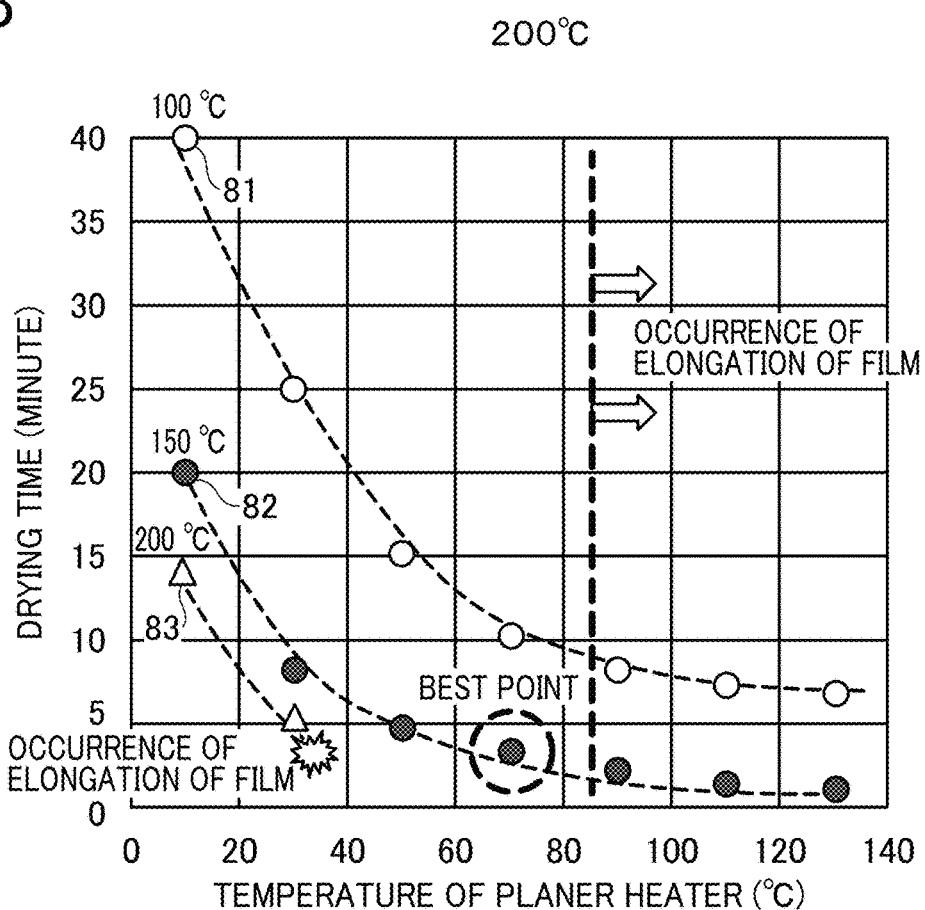
FIG. 8 is a graph of a relation between temperature of a surface heater and drying time of a liquid on the film.

Advantages of the above-described setting operation is described with reference to FIG. 8. FIG. 8 is a graph of a relation between temperature of a surface heater and drying time of a liquid on the film 20 when the front surface of the film 20 is heated by the hot air blown at a predetermined temperature and the back surface of the film 20 is heated by heat transferred from the surface heater. The drum heater 113 is an example of the surface heater. The surface heater is also referred to as "planer heater".

Thus, FIG. 8 illustrates an example of the relation between the heating temperature of the drum heater 213 and the drying time of the liquid on the film 20 when the front surface of the film 20 is heated by the noncontact heater 211 and the back surface of the film 20 is heated by the drum heater 213. A surface temperature (temperature at a surface) of the drum heater 213 is variable.

In FIG. 8, the horizontal axis represents the temperature of the surface heater, and the vertical axis represents the time taken for drying a predetermined amount of liquid adhered to the film 20. In the following description, the "time taken for drying a predetermined amount of liquid adhered to the film 20" may be simply referred to as "drying time".

In FIG. 8, white circles 81 indicate temperature of the hot air at 100° C., black circles 82 indicate temperature of the hot air at 150° C., and triangular marks 83 indicate temperature of the hot air at 200° C.

As illustrated in FIG. 8, the drying time decreases as increase of the temperature of the surface heater. When the temperature of the hot air is 100° C. and 150° C., an elongation of the film 20 is occurred when the temperature of the surface heater is 85° C. or higher. Conversely, when the temperature of the hot air is 200° C., the elongation of the film 20 is occurred when the temperature of the surface heater is about 35° C. that is lower than the temperature (85° C.) at which the elongation of the film 20 occurs when the temperature of the hot air is 100° C. and 150° C.

Thus, FIG. 8 illustrates that it is preferable to heat the film 20 with the hot air at temperature of around 150° C. and the surface heater at temperature of around 70° C. that dries the liquid adhered to the film 20 in a time of about several seconds (marked by "BEST POINT" in FIG. 8).

Figure 9:
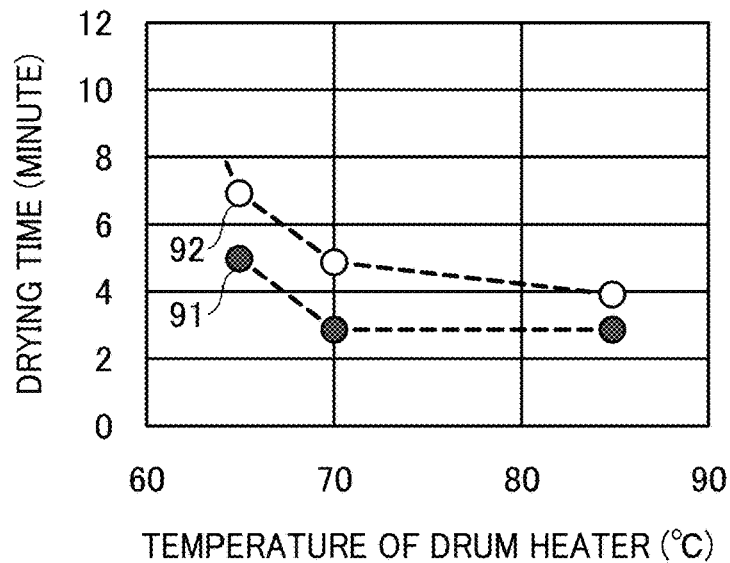
FIG. 9 is a graph of a relation between temperature of the drum heater and drying time of a liquid adhered onto the film.

FIG. 9 is a graph of a relation between temperature of the drum heater 213 and drying time of a liquid adhered onto the film 20. In FIG. 9, a predetermined amount of liquid adhered onto the front surface of the film 20 is heated by the noncontact heater 211 at 150° C. and the back surface of the film 20 is heated by the drum heater 213. In FIG. 9, black circles 91 represents the relation when an amount of liquid adhered on the film 20 is in a first condition. White circles 92 represents the relation when the amount of liquid adhered onto the film 20 is in a second condition in which an amount of liquid adhered onto the film is larger than the first condition.

FIG. 9 illustrates that it is preferable to heat the film 20 with the hot air at temperature of around 150° C. generated by the noncontact heater 211 and the drum heater 213 at temperature of less than 85° C. that dries the liquid adhered to the film 20 in a time of about several seconds. For example, when the temperature of the drum heater 213 is less than 85° C., the drying time is 8 seconds or less, and when the temperature of the drum heater 213 is 70° C. or more and less than 85° C., the drying time is 6 seconds or less.

Experiments similar to the experiments illustrated in FIGS. 8 and 9 were conducted while changing the heating temperature of the hot air from the noncontact heater 211 and the heating temperature of a contact heater such as the drum heater 213 (surface heater) or the like. It is found that the liquid on the film 20 can be dried within practical drying time of several seconds when the heating temperature of the noncontact heater 211 is 140° C. or more and 160° C. or less, and the temperature of the heat transferred to the film 20 from the drum heater 213 (contact heater) is less than 85° C.

A range of "several seconds as a practical drying time" is 8 seconds or less when the temperature of the drum heater 213 is less than 85° C. and is 6 seconds or less when the temperature of the drum heater 213 is 70° C. or more and 85° C. or less.

Figure 10:
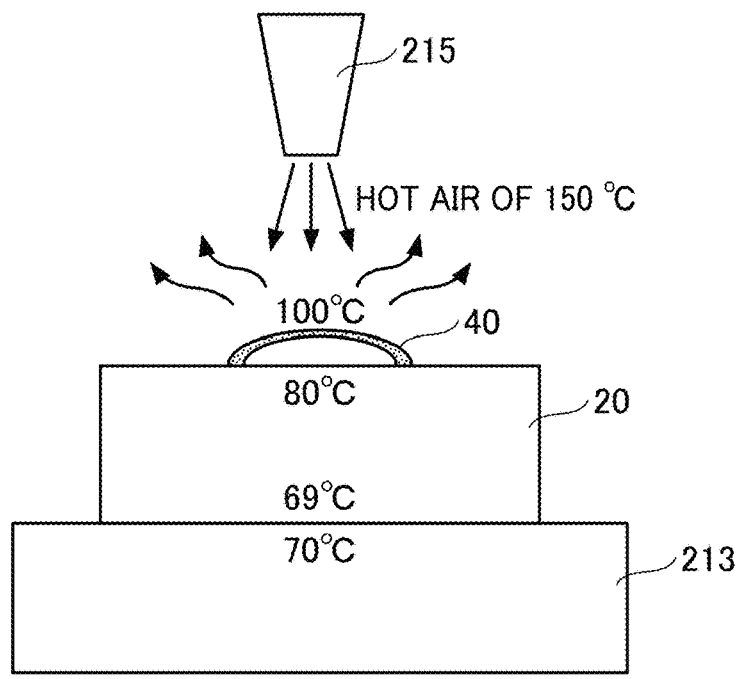
FIG. 10 is a schematic side view of the dryer and the film according to the first embodiment.

FIG. 10 illustrates a mechanism to obtain an above-described effect. In FIG. 10, the drum heater 213 at temperature of 70° C. is in contact with the back surface of the film 20. Further, a liquid 40 is adhered onto the front surface of the film 20, and the noncontact heater 211 (nozzle 215) blows the hot air at temperature of 150° C. toward the liquid 40.

The temperature of the liquid 40 becomes 100° C. or more by the heat transferred from the hot air at the temperature of 150° C. generated from the noncontact heater 211 (nozzle 215) that promotes drying of the film 20. However, influence of the drum heater 213 in contact with the film 20 at temperature of 70° C. is dominant for the film 20. Thus, the temperature of the film 20 is kept at 80° C. or lower at which the elongation of the film 20 does not occur even if the hot air at temperature of 150° C. is blown onto the front surface of the film 20 on which the liquid 40 is discharged and adhered.

A phenomenon in which the temperature of the drum heater 213 in contact with the film 20 becomes dominant is also verified by an experiment in which the film 20 does not elongate when the temperature of the drum heater 213 is set to about 15° C. and the hot air of 200° C. is blown onto the film 20.

Such a mechanism as described-above can dry the liquid adhered onto the film 20 at high speed by setting the temperature of the drum heater 213 to less than 85° C. and setting the heating temperature of the noncontact heater 211 to 140° C. or more and 160° C. or less while preventing the elongation of the film 20.

As described above, the dryer 2 according to the present disclosure can dry the film 20 at high speed without damaging the film 20. Further, the dryer 2 can reduce the size of the image forming apparatus 100 while drying the liquid adhered onto the film 20.

Particularly, a liquid such as an aqueous ink takes time to dry. Thus, the aqueous ink may restrict increase of the speed of image formation. However, shortening the drying time of the liquid discharged onto the film 20 can increase the speed of image formation.

Conversely, if a solvent-based ink is used as the liquid, problems such as ignition or volatile vapor may occur that may cause danger. Further, when an image is formed using a solvent-based ink in food packaging applications, the residual odor of the solvent-based ink may cause a problem. Conversely, the aqueous ink is suitable for applications such as food packaging because the aqueous ink does not cause danger due to ignition and volatile vapors, for example, and also does not cause residual odor, for example. However, the aqueous ink has a disadvantage to take time for drying.

The dryer 2 according to the present disclosure enables high-speed drying of the aqueous ink and thus enable high-speed image formation on the film 20 for the soft packaging even when the aqueous ink is used. Thus, the dryer 2 according to the present disclosure enable high-speed image formation without causing problems such as danger due to ignition and volatile vapor or residual odor.

Further, OPP films suitable as soft packaging films have properties that are weak against heat. That is, OPP films are easily elongated by heat. Thus, it is difficult to dry the liquid adhered onto the OPP film at high speed while preventing the elongation of the OPP film. However, the dryer 2 according to the present disclosure can dry the liquid adhered onto the OPP film at high-speed while preventing the elongation of the OPP film even when the OPP film is used as a recording medium. Thus, the image forming apparatus 100 according to the present disclosure can form image on the film 20 at high-speed.

When a film made of a material different from the OPP film, for example, a PET film or a nylon film is used as the recording medium, an elongation of the film 20 due to heating of the noncontact heater 211 is small as described above. Thus, when the film such as the PET film or the nylon film is used, the temperature of the hot air is kept at 140° C. or more and 160° C. or less, and the temperature of the drum heater 213 is set at around 100° C. that further shortens the ink drying time. In this way, selecting a combination of the heating temperature by the noncontact heater 211 and the temperature of the drum heater 213 according to the material of the film 20 can promote the drying of the liquid adhered on the film 20.

The dryer 2 can dry the film 20 at high-speed by setting the temperature of the drum heater 213 to be 70° C. or more and less than 85° C.

Further, the drum heater 213 includes a cylindrical member around which the film 20 is wound as a contact heater. The drum heater 213 can heat an entire of the film 20 and dry the liquid adhered onto the film at high speed during a conveyance process of the film 20 in an image formation process while preventing an elongation of the film 20.

In the above-described example, the colored liquid is adhered to the film 20. However, the liquid used in the present disclosure is not limited to the colored liquid. For example, a liquid to modify a surface of the film such as a pre-coating liquid may be attached to a part or entire of the film 20 prior to image formation. Further, after the colored liquid is discharged and adhered on the film 20, a liquid for protecting the colored liquid or the like such as a post-coating liquid may be attached to a part or entire of the film 20. The dryer 2 according to the present disclosure can also be applied to drying of the pre-coating liquid or the post-coating liquid as described-above.

Second Embodiment

The dryer 2 according to the first embodiment uses the hot air blown onto the film 20 as an example of the noncontact heater 211. The dryer 2 according to the second embodiment uses an infrared (IR) heater as a noncontact heater 211. The infrared heater is a heater that irradiates and heats an object with infrared rays. The infrared heater may be of any wavelength from near infrared to far infrared. An appropriate wavelength may be determined according to the material of the liquid discharged and adhered on the film 20.

The infrared heater can obtain effects such as increasing an efficiency of heat transfer, saving space, reducing pre-heating time, easy to control, for example.

The effects of the second embodiment other than the effects described-above are the same as the effects described in the first embodiment.

In the above description, hot air and irradiation of the infrared ray are described as examples of the noncontact heater 211. However, the present disclosure is not limited to the embodiments as described above. Further, although the drum heater 213 is described as an example of a contact heater that transfers heat while contacting the film 20, the contact heater is not limited to the drum heater 213. For example, the contact heater may be a surface heater or the like.

The above-described embodiments describe a dryer, a liquid discharge apparatus, a drying method, and a program to dry the liquid adhered onto the film 20. However, the above-described embodiments are illustrative and do not limit the present disclosure. Thus, numerous additional modifications and variations are possible in light of the above teachings.

Figure 11:
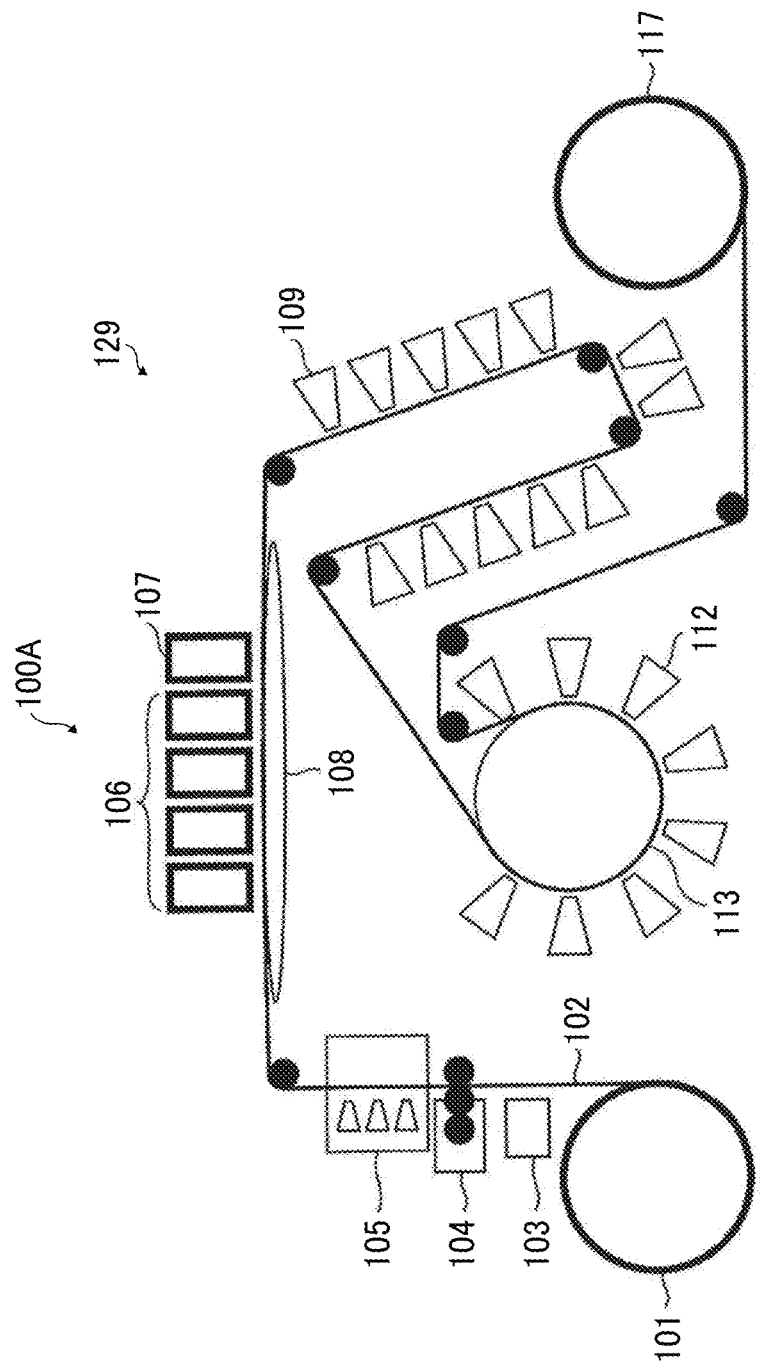
FIG. 11 is a schematic side view of an example of an inkjet recording apparatus according to the present disclosure.

An inkjet recording apparatus according to the present disclosure is described with reference to FIGS. 11 and 12. FIG. 11 is a schematic side view of the inkjet recording apparatus 100A according to the present disclosure. The inkjet recording apparatus 100A according to the present disclosure is a line-head type inkjet recording apparatus and is a full-line type (hereinafter also referred to as "line type") inkjet recording apparatus. In the present disclosure, a first ink is a color ink and a second ink is a white ink.

The inkjet recording apparatus 100A includes a feeder 101, a corona treatment device 103, a pre-coating liquid application device 104, a pre-coating liquid dryer 105, inkjet heads 106 (first inkjet discharge devices) for color inks, inkjet head 107 (second inkjet discharge device) for white ink, a platen 108, hot-air nozzles 109 (first dryers), a dryer 129, a drum heater 113 (second dryer), hot-air nozzles 112 facing the drum heater 113, and a winder 117. FIG. 11 illustrates the inkjet recording apparatus 100A includes one drum heater 113. FIG. 12 illustrates the inkjet recording apparatus 100A includes two drum heaters 113 and 115. A detail of each units and processes is described below.

The inkjet heads 106 (first inkjet discharge devices) to discharge the color inks are an example of a first application device. The inkjet head 107 (second inkjet discharge device) to discharge the white ink is an example of a second application device.

The hot-air nozzle 112 is an example of a hot-air generator to generate hot air and discharges the hot air from a nozzle onto an impermeable base material 102. A film is an example of the impermeable base material 102.

[Feeder and Feeding Process, and Winder and Winding Process]

A feeder 101 and a winder 117 are used to feed and wind an impermeable base material 102 in the present disclosure. The feeder 101 rotates to supply the impermeable base material 102 stored in a rolled form to the conveyance path inside the inkjet recording apparatus 100A. The winder 117 rotates to wind up the impermeable base material 102 on which an image is formed by applying ink and stores the impermeable base material 102 in a rolled form.

The impermeable base material 102 in the present disclosure is a film-formed base material continuous in the conveyance direction of the inkjet recording apparatus 100A. 0 The impermeable base material 102 is conveyed along the conveyance path between the feeder 101 and the winder 117.

Further, a length of the impermeable base material 102 in the conveyance direction is longer than at least a length of the conveyance path between the feeder 101 and the winder 117. As described above, the inkjet recording apparatus 100A uses a base material continuous in the conveyance direction of the inkjet recording apparatus 100A to continuously printing the image on the impermeable base material 102 for a long time.

[Corona Treatment Device and Corona Treatment Process]

A corona treatment device 103 illustrated in FIG. 11 performs the corona treatment on the impermeable base material 102 by corona discharge to modify the surface of the impermeable base material 102. The corona treatment performs a corona discharge on the impermeable base material 102 fed and conveyed from the feeder 101 to modify the surface of the impermeable base material 102.

The corona treatment is not required and may not be carried out. However, it is preferable to perform the corona treatment before a pre-coating process because the corona treatment can improve adhesion of a pre-coating layer to the impermeable base material 102. Further, instead of the corona treatment, atmospheric pressure plasma treatment, frame treatment, ultraviolet irradiation treatment and the like may be performed.

As a device to perform the corona treatment, various known devices can be used. Further, various conditions (discharge amount of corona, for example) of the corona treatment are not particularly limited and can be appropriately changed.

[Pre-Coating Liquid Application Device and Pre-Coating Liquid Application Process]

The pre-coating liquid application device is a device to apply a pre-coating liquid to the impermeable base material 102. In FIG. 11, the pre-coating liquid application device 104 rotates a roller, to which the pre-coating liquid is adhered, and contacts the roller to the impermeable base material 102 to apply the pre-coating liquid to a surface of the impermeable base material 102.

As a device to apply the pre-coating liquid, there is a device to contact a roller, to which the pre-coating liquid is adhered, to the impermeable base material 102. However, the device to apply the pre-coating liquid is not limited to the embodiments as described above. Further, various known devices such as a spin coating, a spray coating, a gravure roll coating, a reverse roll coating, a bar coating, an inkjet coating, and the like may be used.

The pre-coating liquid application process applies the pre-coating liquid to the impermeable base material 102. In the present disclosure, the pre-coating liquid is applied to the impermeable base material 102 fed and conveyed from the feeder 101.

The pre-coating liquid is applied onto the impermeable base material 102 to form a pre-coating layer on the impermeable base material 102. The pre-coating layer is also referred to as a "surface treatment layer" or the like. The impermeable base material 102 is heated after the application of the pre-coating liquid on the impermeable base material 102 to promote formation of the pre-coating layer.

Application of the pre-coating liquid onto the impermeable base material 102 can improve a lamination strength at time of laminating a lamination film onto the image formed with the impermeable base material, the color ink, and the white ink so that a good soft package can be obtained.

An amount of the pre-coating liquid applied to the impermeable base material 102 is not particularly limited. However, the amount of pre-coating liquid is preferably 0.01 $g/m^2$ or more and 2.0 $g/m^2$ or less, and more preferably 0.02 $g/m^2$ or more and 1.6 $g/m^2$ or less. When the amount of pre-coating liquid is 0.01 $g/m^2$ or more, the laminate strength is improved. Further, when the amount of pre-coating liquid is 2.0 $g/m^2$ or less, the drying time for drying the pre-coating liquid can be shortened. Thus, the inkjet recording apparatus 100A can perform recording process at high speed.

[First Discharge Device, Second Discharge Device, First Discharge Process, and Second Discharge Process]

A first discharge device and a first discharge process are a device and a process of discharging the first ink (color ink) to the impermeable base material 102 to which the pre-coating liquid is applied. A second discharge device and a second discharge process are a device and a process of discharging the second ink (white ink) to the impermeable base material 102 after the impermeable base material 102, to which the pre-coating liquid is applied, is heated. The first discharge device and the second discharge device may be referred to as an ink application device, and the first discharge process and the second discharge process may be referred to as an ink application process.

In the present disclosure, as illustrated in FIG. 11, four numbers of inkjet heads 106 to discharge respective color inks are used as a first discharge device, and an inkjet head 107 for a white ink is used as a second discharge device.

Each of the inkjet heads 106 has a plurality of nozzle arrays in which a plurality of nozzles are arranged. The plurality of nozzles are provided on each of the inkjet heads 106 so that the discharge direction of ink from the plurality of nozzles is directed toward the impermeable base material 102. Thus, the inkjet head 106 sequentially discharges liquid of each color of magenta (M), cyan (C), yellow (Y), and black (K) to the pre-coating layer on the impermeable base material 102. Here, the order of discharge can be appropriately changed.

The inkjet head 107 to discharge white ink is disposed on a downstream side of the inkjet heads 106. The white ink is overlapped on the color ink to improve a visibility of the printed matter from the transparent surface of the impermeable base material 102.

The inkjet heads 106 and 107 of the present disclosure are line-type (full-line type) inkjet heads. The "line-type inkjet head" is an inkjet head in which the plurality of nozzles to discharge ink is arranged over the entire width in the conveyance direction of the impermeable base material 102. The width of the inkjet head may be changed within a range that does not influence effects of the present disclosure.

For printing in industrial use, it is necessary to perform a large amount of printing at a high speed. Thus, it is preferable to use an inkjet recording system using a line-type inkjet head as illustrated in FIG. 11 for the printing in industrial use. Since printing for industrial use continuously prints for a long time, the ink in some nozzles, in which ink is not discharged for a long time, is dried that cause discharge failure of the inkjet heads when a line-type inkjet head is used.

Thus, in the ink application process, it is preferable to vibrate an interface of the ink in the nozzles for the nozzles that do not discharge ink. The inkjet head in the present disclosure vibrates the interface of the ink inside the nozzle to mix the ink in the nozzle and the ink in the ink channel in the inkjet head such as the pressure chamber communicating with the nozzle to be uniform. Thus, the inkjet head can prevent drying of the ink in the nozzles. Thus, the inkjet head can further reduce an occurrence of abnormal images due to discharge failure. Here, the "interface of ink in the nozzle" is an interface between atmosphere and an ink in contact with the atmosphere.

In the inkjet heads 106 and 107, a device to apply a stimulus to the ink to discharge the ink may be appropriately selected according to the purpose, and examples of the devices include a pressure device, a piezoelectric device, a vibration generator, an ultrasonic oscillator, and light, for example. Specifically, the device may be a piezoelectric actuator such as piezoelectric elements, a shape-memory alloy actuator using metallic-phase change due to temperature change, an electrostatic actuator using electrostatic force, or the like.

Particularly, the device using the piezoelectric actuator is preferable. The inkjet head including the piezoelectric actuator applies a voltage to a piezoelectric element adhered to a position called a pressure chamber (also referred to as a liquid chamber) located in an ink channel in the inkjet head. Thus, the piezoelectric element bends, and a volume of the pressure chamber is reduced so that the ink in the pressure chamber is pressurized to be discharged from the nozzles of the inkjet head as ink droplets.

It is preferable to apply a minute voltage to the piezoelectric element that minutely drives the piezoelectric element in a degree not discharging the ink for a part of nozzles from which ink is not to be discharged according to a shape of the image to be formed on the impermeable base material 102. The minute voltage vibrates the interface of the ink in the part of nozzles from which ink is not discharged. Hereinafter, the process of applying the minute voltage to the piezoelectric element that minutely drives the piezoelectric element is referred to as "micro-drive".

The inkjet recording apparatus 100A according to the present disclosure discharges the color ink after the application of the pre-coating liquid on the impermeable base material 102 and thus can reduce bleeding at color boundary in the image and obtain a good image. A pre-coating liquid contains a coagulant may cause coagulation of the coagulant in the pre-coating layer and the colorant in the color ink while the color ink wets and spreads on the pre-coating liquid when the color ink is discharged after the application of the pre-coating liquid on the impermeable base material 102. Thus, the inkjet recording apparatus 100A can reduce streaks in the image and reduce bleeding in the color boundary in the image and can obtain further excellent image.

A printing speed in the inkjet recording apparatus 100A and the inkjet recording method according to the present disclosure is preferably from 30 m/min. to 100 m/min. although the printing speed has to be adjusted according to other processes such as the pre-coating process and the drying process. The inkjet recording apparatus 100A that prints with the speed of 30 m/min. to 100 m/min. can be suitably used in industrial applications requiring high-speed printing.

[Conveyor and Conveyance Process]

The platen 108 guides the impermeable base material 102 to be conveyed along the conveyance path. Further, conveyance rollers are also used as a conveyance device.

[First Dryer and First Drying Process]

The first dryer heats the impermeable base material 102 with hot air or infrared rays after the first ink (color ink) and the second ink (white ink) are discharged onto the impermeable base material 102. The first drying process includes steps of heating the impermeable base material 102, onto which the first ink (color ink) is discharged, with the hot air or the infrared rays.

Figure 12:
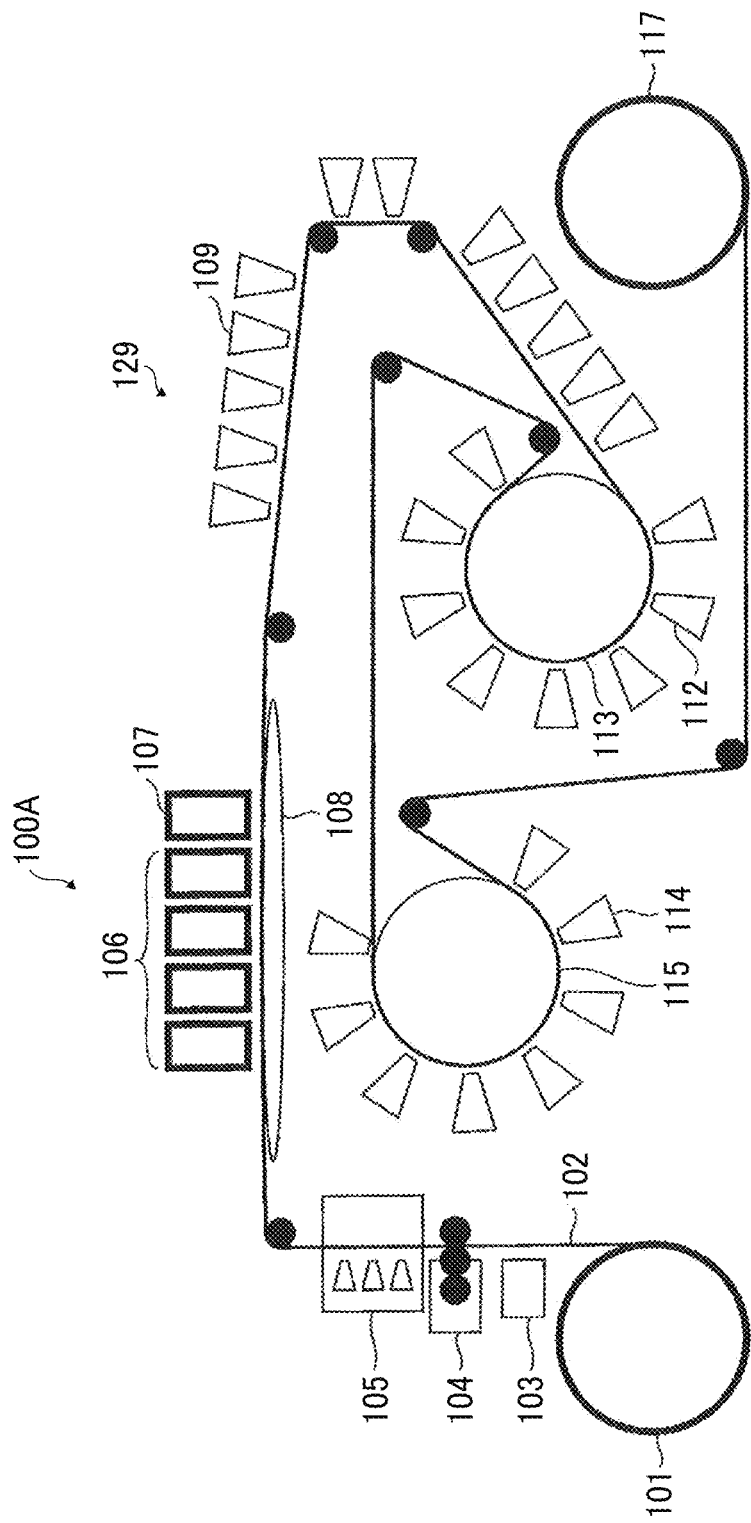
FIG. 12 is a schematic side view of another example of the inkjet recording apparatus according to the present disclosure.

As illustrated in FIGS. 11 and 12, the inkjet recording apparatus 100A according to the present disclosure uses a configuration in which a plurality of hot-air nozzles 109 are arranged as the first dryer. The inkjet recording apparatus 100A in the present disclosure applies the color ink and the white ink onto the impermeable base material 102 to which the pre-coating liquid is applied. Thus, the color ink and the white ink are overlapped over the pre-coating liquid on the impermeable base material 102. Then, the inkjet recording apparatus 100A heats the impermeable base material 102 using only the hot-air nozzles 109 without using the drum heater 113. Thus, the inkjet recording apparatus 100A can prevent a decrease in a lamination strength between the impermeable base material and a laminated film.

The following describes the reason for above-described phenomenon. The drum heater 113 contacts and heats the impermeable base material 102 so that temperature of resin as a component in the pre-coating layer is easily increased. However, in the soft packaging printing, the white ink is entirely applied (overlapped) over the color ink in many cases. When the impermeable base material 102 is heated with the drum heater 113 in a state in which a large amount of solvent contained in the color ink and the white ink is left immediately after the printing process, a component of solvent in the ink easily permeates into a high-temperature pre-coating resin layer. Thus, the pre-coating layer easily dissolves. An amount of solvent contained in the white ink is smaller than an amount of solvent contained in the color ink.

Thus, the inkjet recording apparatus 100A in the present disclosure does not use the drum heater 113 and uses the hot-air nozzles 109 to heat and dry the solvent remaining in the ink (the color inks and the white ink) on the impermeable base material 102 only from the front surface (ink surface) of the impermeable base material 102, which is difficult to raise the temperature of the impermeable base material 102, after the inkjet recording apparatus 100A discharges the color ink and the white ink, respectively, from the inkjet heads 106 and 107 (first discharge device and second discharge device).

Thus, the inkjet recording apparatus 100A can prevent dissolution of the pre-coating layer when the color ink and the white ink are overlapped and printed on the pre-coating layer formed on the impermeable base material 102. Thus, the inkjet recording apparatus 100A can increase the lamination strength without impairing a function of the pre-coating layer that improves the adhesion between the ink component and the impermeable base material 102.

Figure 13:
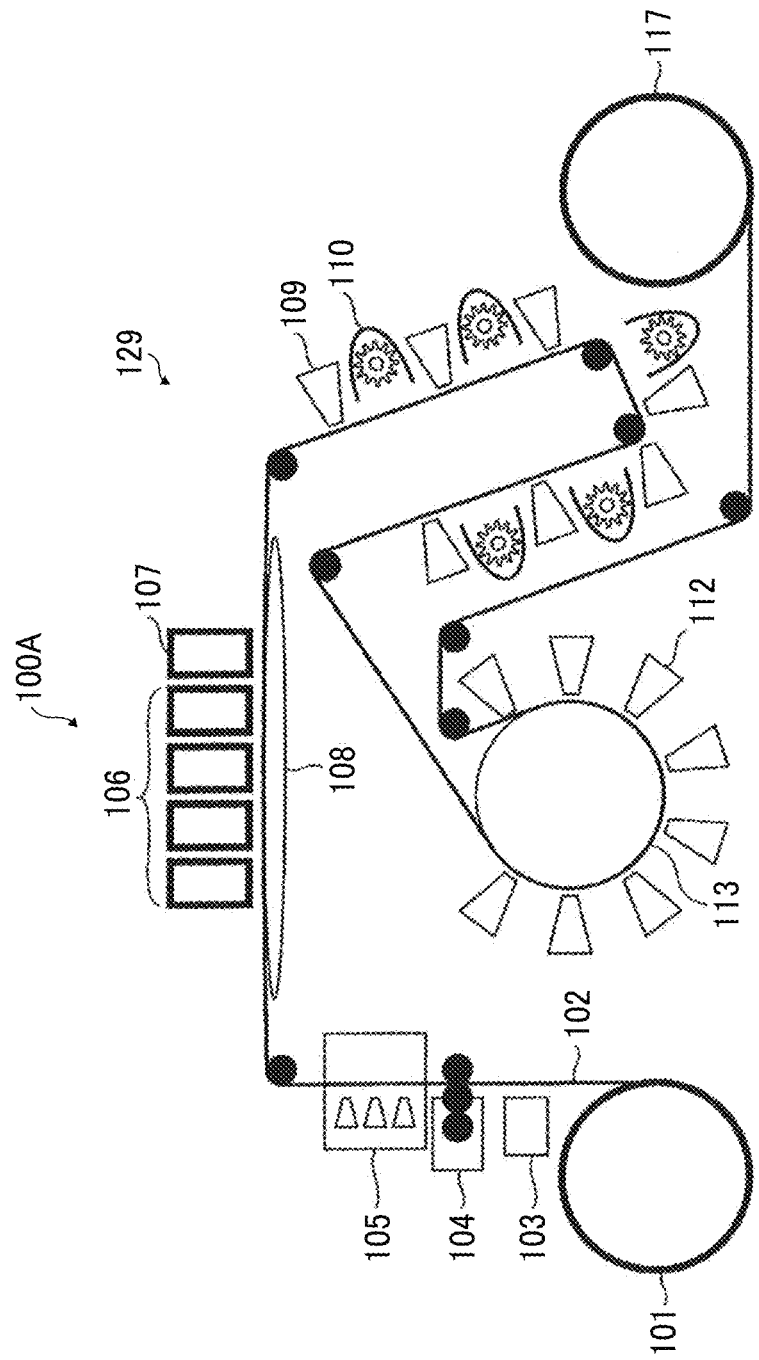
FIG. 13 is a schematic side view of still another example of the inkjet recording apparatus according to the present disclosure.
Figure 14:
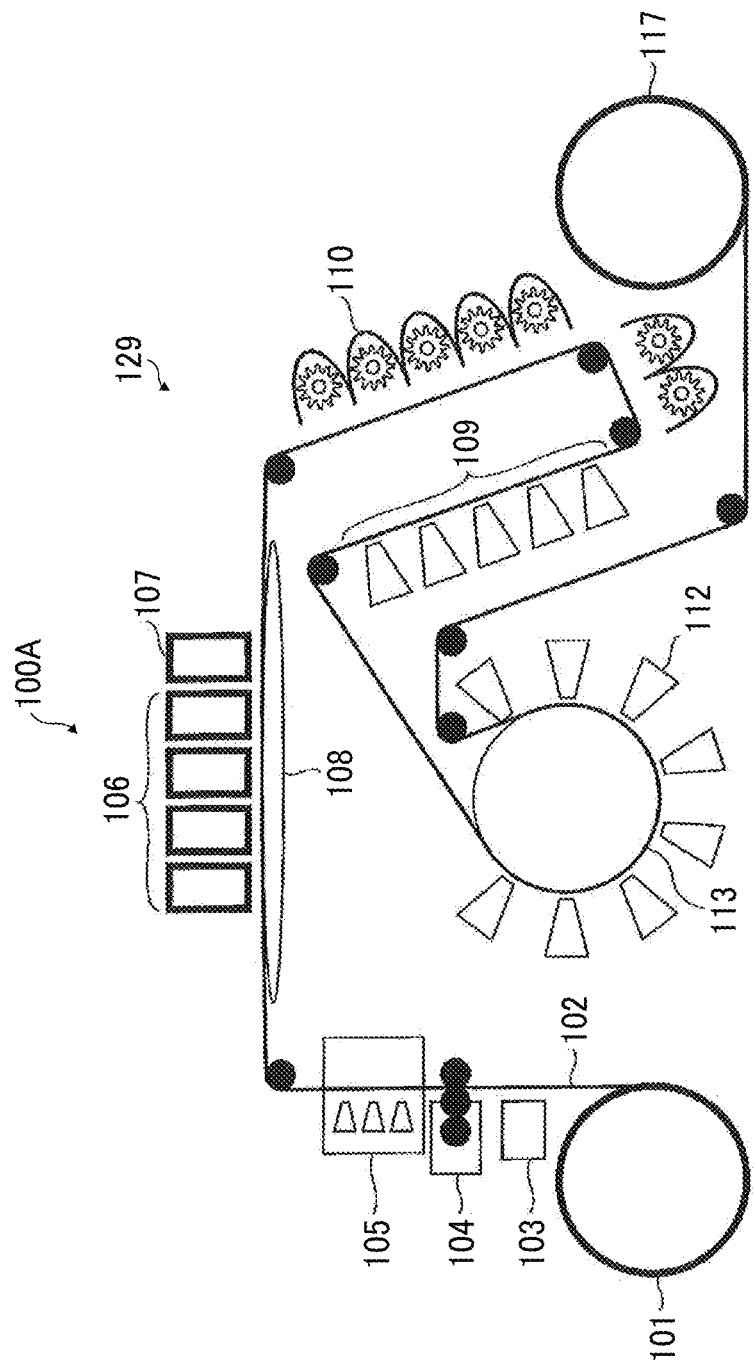
FIG. 14 is a schematic side view of still another example of the inkjet recording apparatus according to the present disclosure.

FIGS. 13 and 14 illustrate the inkjet recording apparatus 100A according to another embodiment of the present disclosure that includes hot-air nozzles 109 and infrared heaters 110 arranged side by side to promote drying of the ink from the front surface (ink application surface) without using the drum heater 113. In FIG. 13, the hot-air nozzles 109 and the infrared heaters 110 are alternately arranged.

Particularly, the infrared heater 110 and the hot-air nozzles alternately arranged can efficiently remove the residual solvent in the ink and can obtain a soft packaged printed material having a high lamination strength and excellent film quality. In FIG. 13, the hot-air nozzles 109 and the infrared heaters 110 are alternately arranged one by one. In FIG. 14, a plurality (group) of hot-air nozzles 109 and a plurality (group) of infrared heaters 110 are alternately arranged.

As a condition to heat the impermeable base material 102 with the hot air blown from the hot-air nozzles 109 without using the drum heater 113, temperature of the hot air blown from the hot-air nozzles 109 should be lower than temperature of hot air used a second heater or a third heater. Blowing hot air at high temperature onto the front surface (ink surface) of the impermeable base material 102 without using the drum heater 113 facing the hot-air nozzles 109 may rapidly solidify the outermost surface of the ink that may to solidify rapidly that may prevent a removal of the solvent inside the ink.

Thus, the impermeable base material is insufficiently dried even after the drying with the second heater or the third heater. Thus, the temperature of the hot-air blown from the hot-air nozzles 109 as the first dryer is preferably in a range of 70° C. to 100° C., and the wind speed is suitably in a range of 10 to 30 m/s.

The infrared heater 110 used together with the hot-air nozzles 109 as the first dryer can heats the ink surface on the impermeable base material 102 with radiant heat. The infrared heater 110 is preferable because the infrared heater 110 does not promote drying of only the outermost surface of the ink since the infrared ray enters the inside of the ink. The maximum output wavelength of the infrared ray of the infrared heater 110 is not particularly limited. However, the maximum output wavelength of the infrared ray is preferably 2.5 to 3.5 μm, for example.

Preferably, the dryer 2 is not disposed between the inkjet heads 106 (first discharge device) for a printing of color ink and the inkjet head 107 (second discharge device) for printing the white ink to overlap the white ink over the color ink. Here, the dryer 2 includes the drum heater 113 and the hot-air nozzles 109 and 112.

Figure 15:
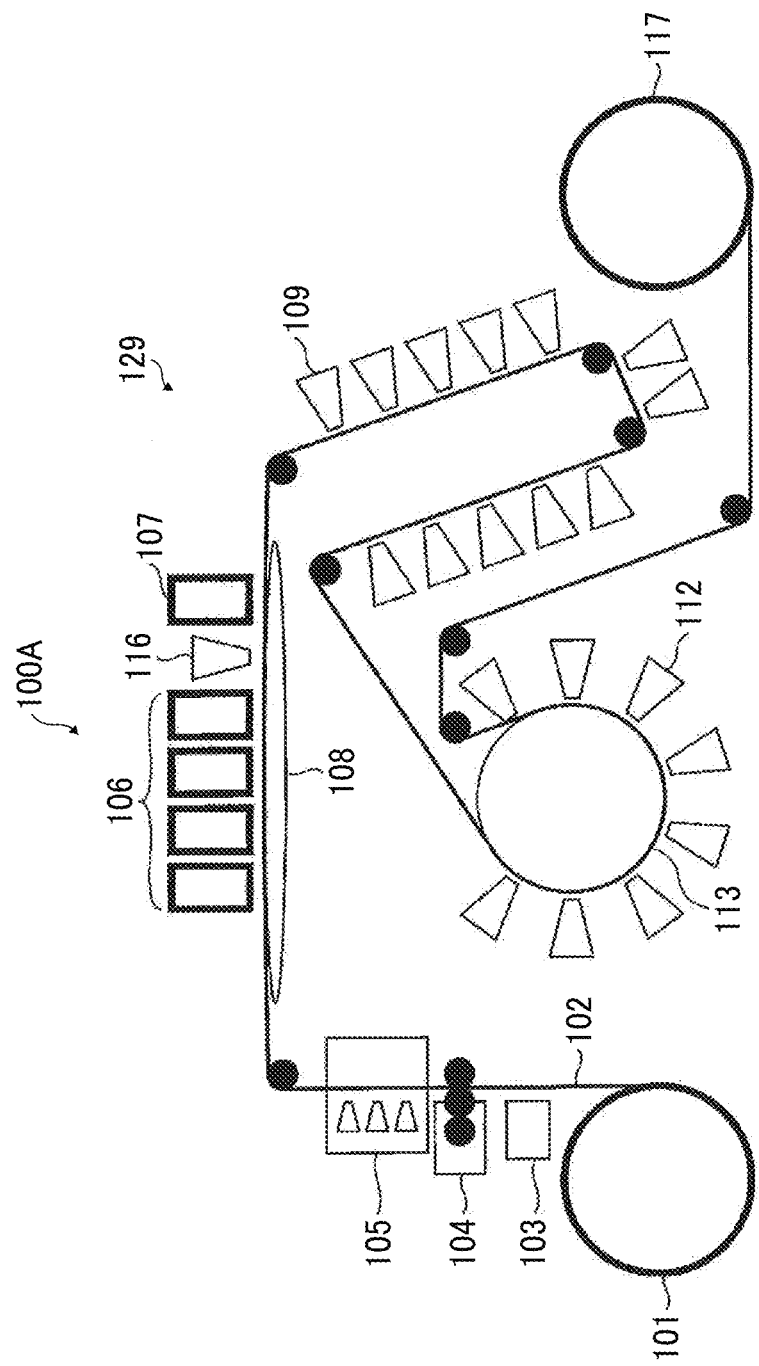
FIG. 15 is a schematic side view of still another example of the inkjet recording apparatus according to the present disclosure.

Drying the ink on the impermeable base material 102 before the printing of white color and immediately after the printing of color inks may solidify a surface of the color ink and lower the adhesion of the color ink with the white ink. Thus, desired lamination strength may not be obtained. FIG. 15 illustrates an example in which a hot-air nozzle 116 is used as the dryer disposed immediately after the inkjet heads 106 (first discharging device).

[Second Dryer and Second Drying Process]

The second dryer is a heater disposed downstream of the above-described first dryer. The second drying process is performed downstream of the first drying process.

Figure 16:
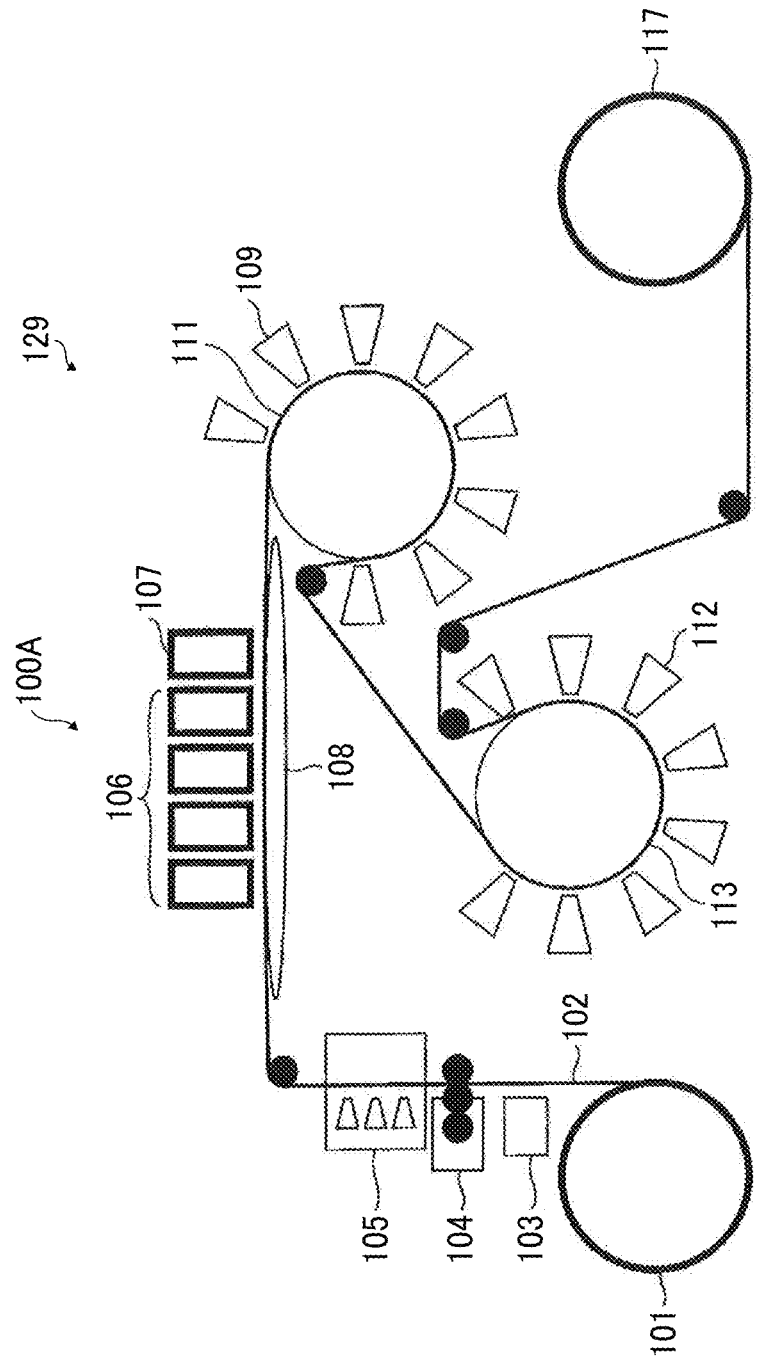
FIG. 16 is a schematic side view of an example of the inkjet recording apparatus in a comparative example 2.
Figure 17:
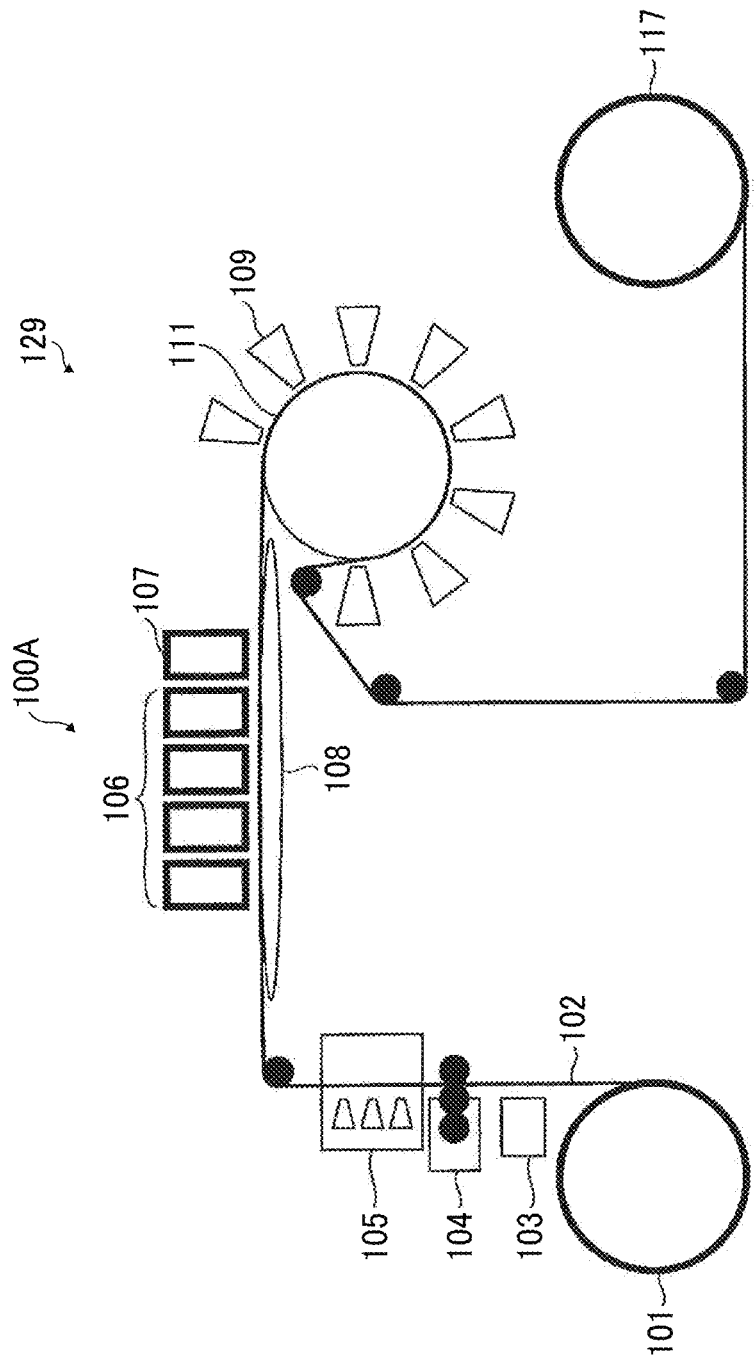
FIG. 17 is a schematic side view of an example of the inkjet recording apparatus in a comparative example 4.

As illustrated in FIG. 16, a drum heater 113 and hot-air nozzles 112 facing the drum heater 113 are arranged at the most downstream side of the conveyance direction of the impermeable base material 102 as the second dryer of the present disclosure. Heating temperature of the drum heater 113 is controllable. Each of the hot-air nozzles 112 includes a nozzle 215 as illustrated in FIG. 5 from which the hot air is blown.

Further, when the inkjet recording apparatus 100A includes a third dryer at the most downstream side of the dryer 2, it is preferable to arrange the hot-air nozzles 112 to face the drum heater 113 and the hot-air nozzles 114 to face the drum heater 115 as the second dryer and the third dryer, respectively, as illustrated in FIG. 12.

The drum heaters 113 and 115 used in the second dryer and the third dryer are temperature adjustable drums. Each of the heating temperature of the drum heaters 113 and 115 has to have a temperature difference between the temperature of the hot air from the hot-air nozzles 112 facing the drum heaters 113 and 115. Thus, each of the drum heaters 113 and 115 preferably includes channels inside a drum to circulate hot water and cooling water to adjust the temperature inside the drum.

[Example of Preparation of Ink]
[Example of Preparation of Black Ink B1]

The following materials were sequentially dispersed and stirred and were filtered with a membrane filter to prepare a black ink.

Black pigment dispersion: 15 parts.
Resin emulsion (VINYBLAN ADH-893D, solid content concentration: 60%, available from Nissin Chemical Industry Co., Ltd.): 8.5 parts.
Surfactant (SOFTANOL EP-5035 available from Nippon Shokubai Co., Ltd.): 2 parts.
Preservative (PROXEL LV available from Avecia Group): 0.1 parts.
1, 2-propanediol: 30 parts 3-Methyl-1,3-Butanediol: 10 parts Ion-exchange water: 34.4 parts.

[Example of Preparation of Cyan Ink C1]

A Cyan ink was prepared in the same manner as the preparation of the black ink except that the cyan pigment dispersion was used instead of the black pigment dispersion in the preparation of the black ink B1.

[Example of Preparation of Magenta Ink M1]

A magenta ink was prepared in the same manner as the preparation of the black ink except that the magenta pigment dispersion was used instead of the black pigment dispersion in the preparation of the black ink B1.

[Example of Preparation of Yellow Ink Y1]

A Yellow ink was prepared in the same manner as the preparation of the black ink except that the yellow pigment dispersion was used instead of the black pigment dispersion in the preparation of the black ink B1.

[Example of Preparation of Black Ink B2]

The following materials were sequentially dispersed and stirred and were filtered with a membrane filter to prepare a black ink.

Black pigment dispersion: 15 parts.
Resin emulsion (VINYBLAN ADH-893D, solid content concentration: 60%, available from Nissin Chemical Industry Co., Ltd.): 8.5 parts.
Surfactant (SOFTANOL EP-5035 available from Nippon Shokubai Co., Ltd.): 2 parts.
Preservative (PROXEL LV available from AVECIA GROUP): 0.1 parts 1, 2-propanediol: 35 parts.
3-Methyl-1,3-Butanediol: 15 parts Ion-exchange water: 24.4 parts.

[Example of Preparation of Cyan Ink C2]

A Cyan ink was prepared in the same manner as the preparation of the black ink except that the cyan pigment dispersion was used instead of the black pigment dispersion in the preparation of the black ink B2.

[Example of Preparation of Magenta Ink M2]

A magenta ink was prepared in the same manner as the preparation of the black ink except that the magenta pigment dispersion was used instead of the black pigment dispersion in the preparation of the black ink B2.

[Example of Preparation of Yellow Ink Y2]

A Yellow ink was prepared in the same manner as the preparation of the black ink except that the yellow pigment dispersion was used instead of the black pigment dispersion in the preparation of the black ink B2.

[Example of Preparation of White Ink W1]

The following materials were sequentially dispersed and stirred and were filtered with a membrane filter to prepare a white ink W1.

White pigment dispersion: 40 parts Resin emulsion (VINYBLAN ADH-893D, solid content concentration: 60%, available from Nissin Chemical Industry Co., Ltd.): 3.5 parts.
Surfactant (SOFTANOL EP-5035 available from Nippon Shokubai Co., Ltd.): 2 parts.
Preservative (PROXEL LV available from AVECIA GROUP): 0.1 parts.
1, 2-propanediol: 25 parts 3-Methyl-1,3-Butanediol: 7 parts Ion-exchange water: 22.4 parts.

[Example of Preparation of White Ink W2]

The following materials were sequentially dispersed and stirred and were filtered with a membrane filter to prepare a white ink W2.

White pigment dispersion: 40 parts.
Resin emulsion (VINYBLAN ADH-893D, solid content concentration: 60%, available from Nissin Chemical Industry Co., Ltd.): 3.5 parts.
Surfactant (SOFTANOL EP-5035 available from Nippon Shokubai Co., Ltd.): 2 parts.
Preservative (PROXEL LV available from Avecia Group): 0.1 parts.
1, 2-propanediol: 20 parts.
3-Methyl-1,3-Butanediol: 5 parts.
Ion-exchange water: 29.4 parts.

[Example of Preparation of White Ink W3]

The following materials were sequentially dispersed and stirred and were filtered with a membrane filter to prepare a white ink W3.

White pigment dispersion: 40 parts.
Resin emulsion (VINYBLAN ADH-893D, solid content concentration: 60%, available from Nissin Chemical Industry Co., Ltd.): 3.5 parts.
Surfactant (SOFTANOL EP-5035 available from Nippon Shokubai Co., Ltd.): 2 parts.
Preservative (PROXEL LV available from Avecia Group): 0.1 parts.
1, 2-propanediol: 30 parts.
3-Methyl-1,3-Butanediol: 10 parts.
Ion-exchange water: 14.5 parts.

[Example of Preparation of White Ink W4]

The following materials were sequentially dispersed and stirred and were filtered with a membrane filter to prepare a white ink W4.

White pigment dispersion: 40 parts.
Resin emulsion (VINYBLAN ADH-893D, solid content concentration: 60%, available from Nissin Chemical Industry Co., Ltd.): 3.5 parts.
Surfactant (SOFTANOL EP-5035 available from Nippon Shokubai Co., Ltd.): 2 parts.

Preservative (PROXEL LV available from Avecia Group): 0.1 parts.

1, 2-propanediol: 35 parts.

3-Methyl-1,3-Butanediol: 15 parts.

Ion-exchange water: 4.4 parts.

Formulas of the color ink and white ink are illustrated in FIGS. 18 to 20.

In FIGS. 18 to 20, numerical values represent parts by mass, unless otherwise specified.

Examples 1 to 23 and Comparative Examples 6 to 7

The inks of black, cyan, magenta, yellow, and white thus prepared were filled in ink containers of inkjet recording apparatuses (modified machine of VC-60000 available from Ricoh Company, Ltd.), and printing was carried out. The ink jet recording apparatus was modified to have a configuration as illustrated in FIGS. 11 to 17. Continuous printing was carried out under the following printing conditions using the modified machine of the inkjet recording apparatus. The printing conditions in each examples and comparative examples are illustrated below. Further, the printing conditions are also illustrated in FIG. 21.

[Printing Conditions]

Printing speed: 50 m/min.

Resolution: 1200×1200 dpi

Printed image: a solid image of white ink was formed to overlap a solid image of black, cyan, magenta, and yellow.

Impermeable base material: OPP 20 μm film (PYLEN P2161 available from Toyobo Co., Ltd.)

Corona processing apparatus: discharge amount of corona is 20 W·min/m$^2$.

Pre-coating liquid application device: a coating roller. When the pre-coating liquid were not applied on the impermeable base material, the coating roller was removed.

Pre-coating liquid: the pre-coating liquid including at least nonionic aqueous emulsion.

Inkjet head: inkjet heads corresponding to inks of colors of black, cyan, magenta, yellow, and white.

Micro-drive condition in the nozzle not discharging liquid (vibrating condition of the ink interface in the nozzle): 2 kHz (output of 20% with respect to piezoelectric voltage at discharge).

Dryer immediately after application of pre-coating liquid: hot-air drying (temperature of hot air: 80° C. and wind speed 20 m/s).

Dryer between the inkjet head for color ink and the inkjet head for white ink: hot-air drying (temperature of hot air: 80° C., wind speed 20 m/s).

Dryer after the inkjet head for white ink: using combination of the following method.

[1] Temperature controllable (variable) drum (drum temperature 70° C.).

[2] Hot-air drying (hot-air temperature 90° C. to 170° C., wind speed 20 m/s) facing the drum heater 113.

[3] Hot-air drying without the drum heater 113 (hot-air temperature 80° C. to 130° C., wind speed 20 m/s).

[4] Infrared drying without the drum heater 113 (HILEX heater HHS 1275 available from Hakko Electric Co., Ltd., surface capacity density of a heating part is 4 W/m$^2$).

Color Inks: any one of B1/C1/M1/Y1 or B2/C2/M2/Y2 in the above-described preparation example.

White Ink: any one of white inks W1 to W4 in the above-described preparation example.

[Evaluation]

After the printing of Examples 1 to 23 and Comparative Examples 6 to 7 as illustrated in FIG. 21, film quality, drying quality, and lamination strength of printed objects were evaluated according to the following methods and evaluation criteria. The result is illustrated in FIG. 22.

[Film Quality]

The film quality of the printed image at the end of printing was visually observed and evaluated according to the following criteria.

[Evaluation Criteria]

A: No abnormality is observed in the printed image.

B: Wrinkles can be observed on the film with a magnifying glass although the wrinkles cannot be visually observed.

C: Wrinkles can be observed on a part of the printed image with naked eyes.

D: Wrinkles can be observed visually on the entire printed image.

[Dry Quality]

Dry quality at the end of printing was evaluated after the printed image was rubbed with a nonwoven fabric according to the following criteria.

[Evaluation Criteria]

A: No abnormality is observed in a printed image.

B: Although abnormality cannot be visually observed, scratches on a printed image can be observed with a magnifying glass.

C: Peeling can be observed on a part of a printed image by visual observation.

D: Peeling of an entire printed image can be visually observed.

[Evaluation of Strength of Lamination]

An adhesive for a dry lamination (main agent TM-320 and curing agent CAT-13B available from Toyo Morton, Ltd.) was coated on a printed image with a bar coater. Then, CPP (PYREN P1128 manufactured by Toyobo Co., Ltd.) was adhered on the adhesive coated on the printed image and then aged at 40° C. for 48 hours. After the laminated film was cut into a width of 15 mm, a peeling strength was measured and evaluated according to the following criteria.

[Evaluation Criteria]

A: a strength of 5 N/15 mm or more can be obtained.

B: a strength of 3 N/15 mm or more and less than 5 N/15 mm can be obtained.

C: a strength of 1 N/15 mm or more and less than 3 N/15 mm can be obtained.

D: only a strength of less than 1 N/15 mm can be obtained.

Figure 23:
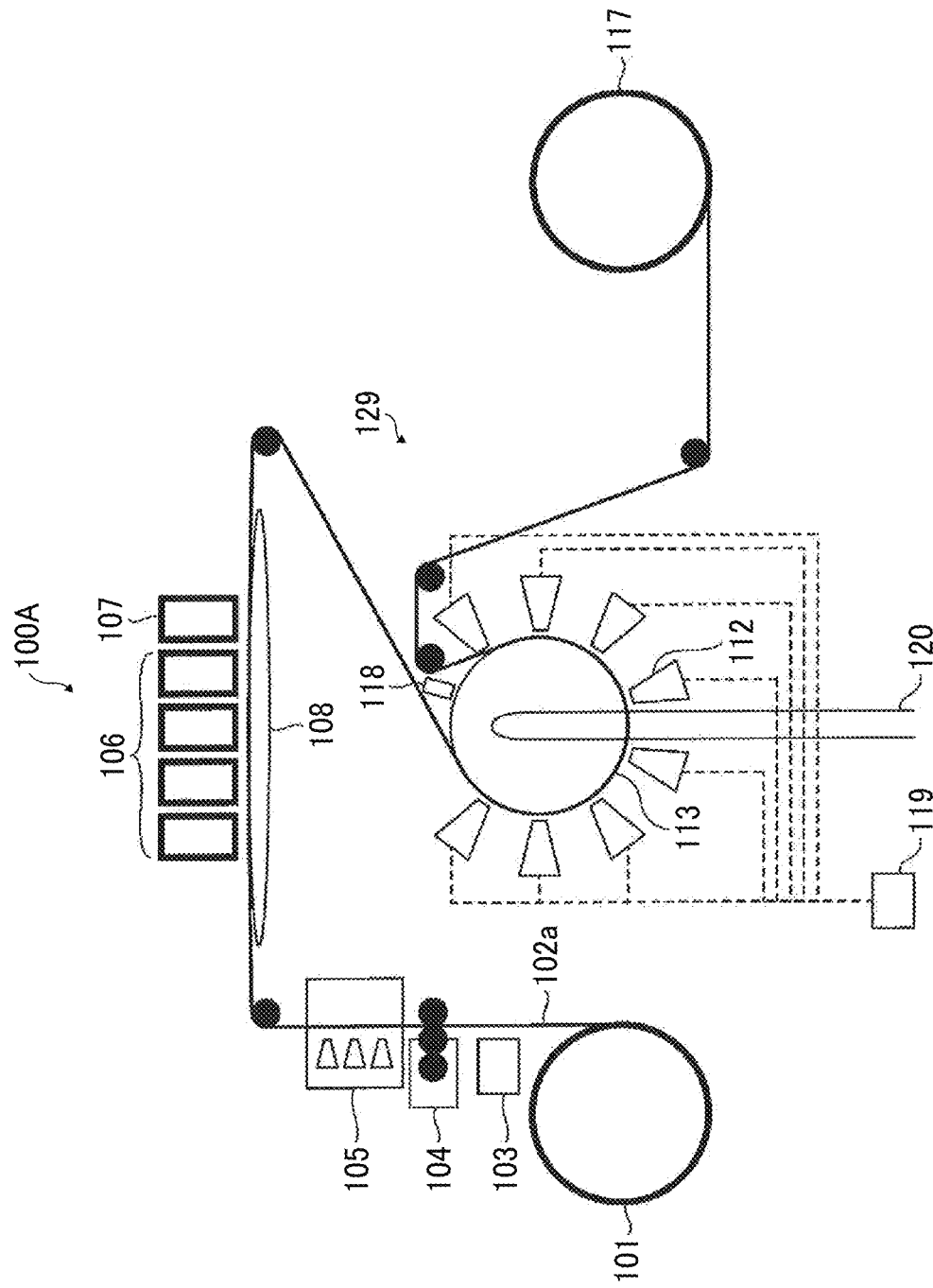
FIG. 23 is a schematic side view of an example of an inkjet recording apparatus according to the present disclosure.

An inkjet recording apparatus according to the present disclosure is described with reference to FIG. 23. FIG. 23 is a schematic side view of the inkjet recording apparatus 100A according to the present disclosure.

The inkjet recording apparatus 100A includes an feeder 101, a corona treatment device 103, a pre-coating liquid application device 104, a pre-coating liquid dryer 105, inkjet heads 106 for color inks, an inkjet head 107 for a white ink, a platen 108, a dryer 129, a drum heater 113, hot-air nozzles 112 facing the drum heater 113, a winder 117, a temperature detection sensor 118, a controller 119, and a cooler 120. A detail of each units and processes is described below.

[Conveyance Mechanism]

A conveyance mechanism of a medium 102a is explained below. The medium 102a is an example of the impermeable base material 102. The medium 102a is installed to the feeder 101 and is wound around the feeder 101 in FIG. 23. The medium 102a is fed and conveyed from the feeder 101 in FIG. 22 and is subjected to a surface treatment with a corona treatment device 103 to improve the wettability. Further, the medium 102a passes through the pre-coating liquid application device 104 and the pre-coating liquid dryer 105, and the pre-coating process is finished.

Figure 27:
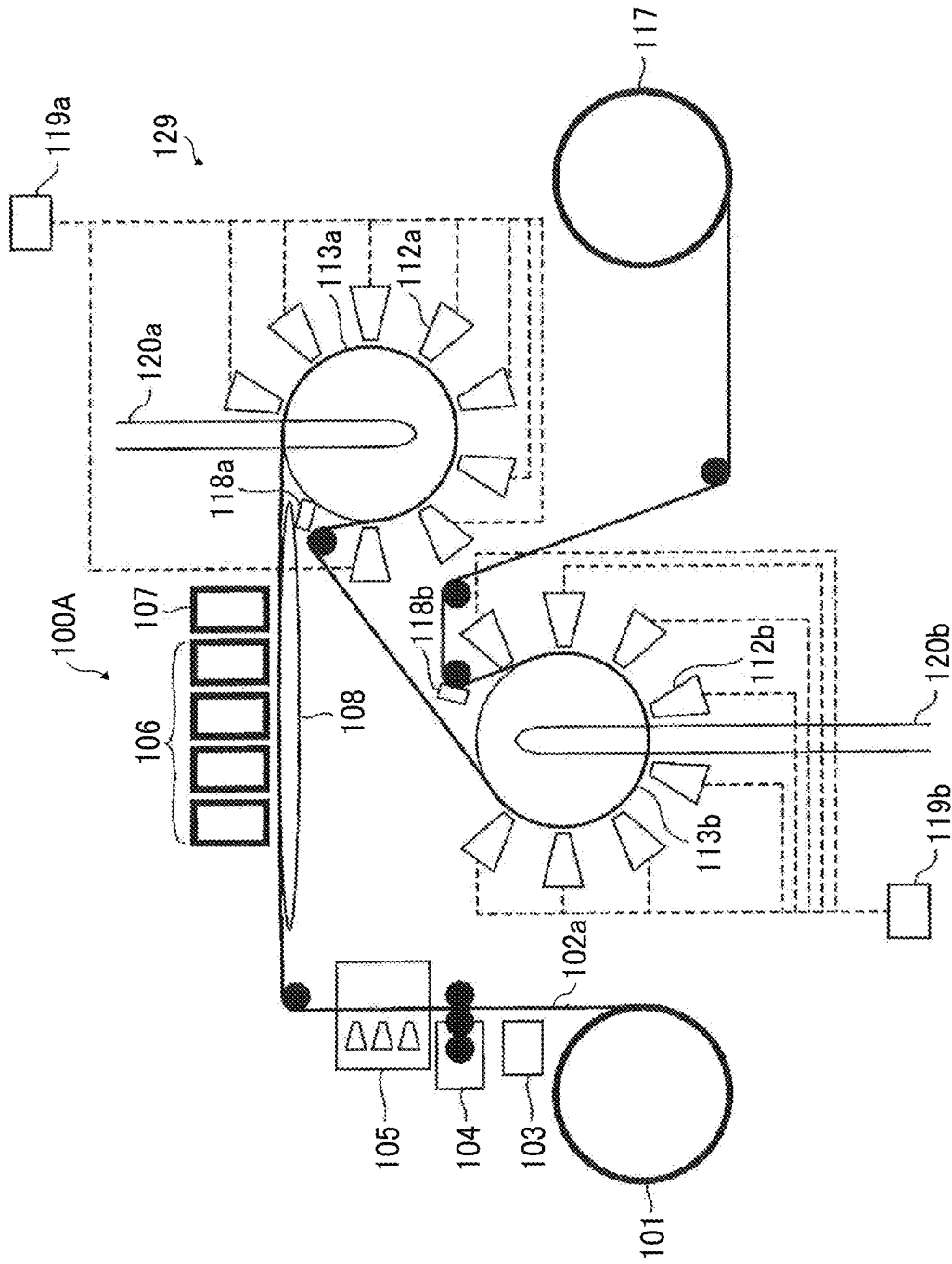
FIG. 27 is a schematic side view of still another example of the inkjet recording apparatus according to the present disclosure.

Then, the inkjet heads 106 for color inks and the inkjet head 107 for white ink discharge the color inks and the white ink to the medium 102a to print an image on the medium 102a while the medium 102a passes over the platen 108. Then, the medium 102a enters a path in the dryer 129 and is dried by the dryer 129 and then wound by the winder 117. The inkjet recording apparatus may include one drum heater 113 as illustrated in FIG. 23 or may include two drum heaters 113a and 113b as illustrated in FIG. 27. A reason for increasing a number of the drum heaters 113 is to extend the distance for drying the medium 102a when a pile-height of ink is high. The pile-height is a height of ink on the medium 102a.

[Pre-Coating Process]

The pre-coating process applies pre-coating liquid on the medium 102a by the pre-coating liquid application device 104. The pre-coating liquid application device 104 illustrated in FIG. 23 includes opposed rollers. However, the pre-coating liquid application device 104 may not include the opposed rollers or may be other types. The pre-coating liquid application device 104 includes a bat in which the pre-coating liquid. The bat includes an anilox roller having a function of circulating a liquid and a function of applying the pre-coating liquid onto an application roller. When the pre-coating liquid application device 104 does not operate, the application roller and the anilox roller are separated. At time of printing, the application roller and the anilox roller are nipped.

The medium 102a is sandwiched between the application roller and the anilox roller (opposing roller), and the pre-coating liquid is applied by the application roller. The pre-coating liquid applied by the application roller is set on the medium 102a with a film thickness of 200 nm. Then, the pre-coating liquid set on the medium 102a is heated by the hot air having high temperature of 200° C. while the medium 102a passing through the pre-coating liquid dryer 105. Thus, the moisture in the pre-coating liquid evaporates.

[Printing Process]

The printing process is performed in a space sandwiched between the inkjet heads 106 for color inks, the inkjet head 107 for the white ink, and the platen 108. When the medium 102a is conveyed onto the platen 108, a color printing is performed on the medium 102a to form a color image by the inkjet heads 106 for color inks. For example, the inkjet heads 106 for color inks may include the inkjet heads filled with respective color inks and are arranged in an order of black, cyan, magenta, and yellow. The order of the colors of the inks is not limited to the order as described above. Then, the inkjet head 107 for white ink forms a base on the color image with a solid image of the white ink. No drying is performed during the printing process.

[Drying Process]

The dryer 129 illustrated in FIG. 23 performs a drying process. The dryer 129 includes the temperature detection sensor 118 in a path of the drum heater 113, and the temperature detection sensor 118 constantly detects surface temperature of a drum of the drum heater 113. A signal from the temperature detection sensor 118 is received by the controller 119 to control the temperature of the hot-air nozzles 112. The ink on the medium 102a is dried by the hot air generated and blown from the hot-air nozzles 112 while the medium 102a is conveyed by rotation of a roller of the drum heater 113 facing the hot-air nozzles 112 with a constant tension applied on the medium 102a.

Functions executed by the controller 119 may be implemented by one or more processing circuits or circuitry. Processing circuitry includes a programmed processor, as a processor includes circuitry. A processing circuit also includes devices such as the central processing unit (CPU), an application specific integrated circuit (ASIC), digital signal processor (DSP), field programmable gate array (FPGA), and conventional circuit components arranged to perform the recited functions.

The drum heater 113 includes a cooler 120. The cooler 120 has a function of flowing cooling water through a pipe passing through the inside of the drum heater 113. The temperature detection sensor 118 is provided on a drum of the drum heater 113 to detect the surface temperature of the drum.

The cooler 120 adjusts the temperature of the cooling water to control the surface temperature of the drum heater 113 to be within a target temperature range. When the medium 102a is conveyed and reached to the drum heater 113, the medium 102a is heated from both of the front surface and the back surface of the medium 102a with the heat generated from the drum heater 113 and the hot air from the hot-air nozzles 112. Thus, moisture in the ink on the medium 102a is evaporated and is dried. Then, the medium 102a is wound up by the winder 117.

[Temperature Detection Sensor]

Figure 24:
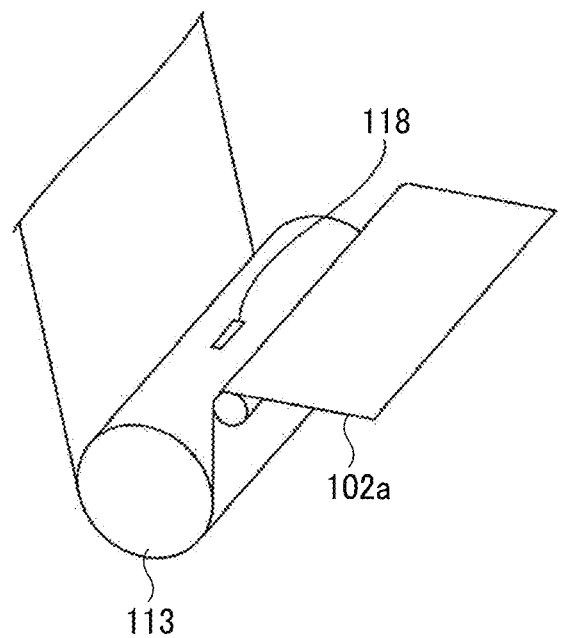
FIG. 24 is a schematic perspective view of an installation example of a temperature detection sensor according to the present disclosure.
Figure 25:
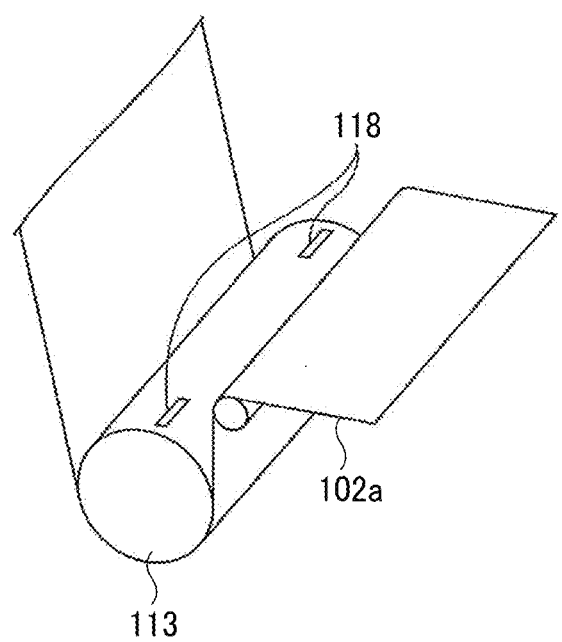
FIG. 25 is a schematic perspective view of another installation example of temperature detection sensors according to the present disclosure.
Figure 26:
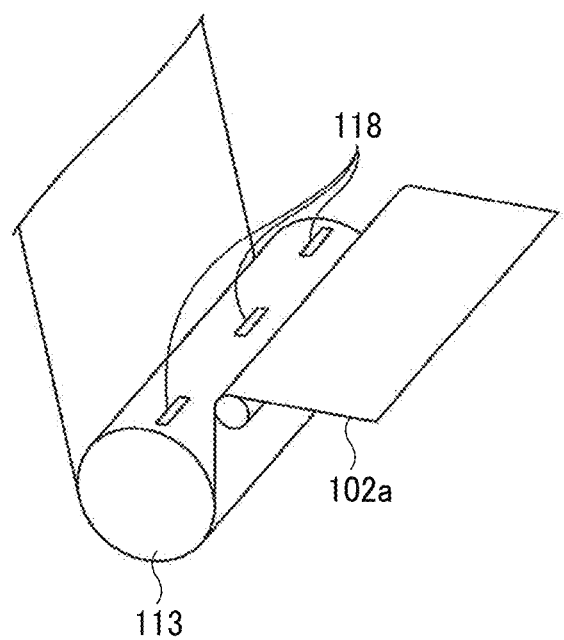
FIG. 26 is a schematic perspective view of still another installation example of the temperature detection sensors according to the present disclosure.

The inkjet recording apparatus 100A may include one temperature detection sensor 118 as illustrated in FIG. 24 or may include two temperature detection sensors 118 arranged in a direction perpendicular to the conveyance direction of the medium 102a as illustrated in FIG. 25 or may include three temperature detection sensors 118 arranged in a direction perpendicular to the conveyance direction as illustrated in FIG. 26. The temperature detection sensor 118 is arranged at a portion of the drum of the drum heater 113 where the medium 102a does not pass through. Thus, the temperature detection sensor 118 directly measures the temperature of the drum of the drum heater 113.

The temperature detection sensor 118 may be a contact-type sensor such as a thermocouple sensor or a noncontact-type sensor using infrared rays. Further, the temperature detection sensor 118 may indirectly detect temperature of a surface of the drum heater 113 above the medium 102a. However, it is necessary to assume the temperature of the medium 102a in advance to indirectly detect the temperature of the surface of the drum heater 113 above the medium 102a. It is necessary to arrange at least one temperature detection sensor 118 on the drum heater 113. Preferably, three temperature detection sensors 118 are arranged along an axial direction of the drum heater 113 so that the temperature detection sensors 118 can detect temperature distribution at each ends and at a center of the drum heater 113.

[Control of Temperature of Drum Heater]

The maximum value of a temperature difference between the temperature of the drum heater 113 and the hot air blown from the hot-air nozzle 112 is fed back to the controller 119. The controller 119 controls the temperature of the cooling water circulating in the drum heater 113 to control the temperature of the drum heater 113.

If the temperature of the drum heater 113 is 70° C. and the temperature of the hot air is 100° C., wrinkles may be formed on a surface of the medium 102a accompanying with drying of the ink on the medium 102a when the temperature of the drum heater 113 rises to 100° C. from 70° C. Thus, the controller 119 maintains the temperature difference between the temperature of the drum heater 113 and the hot air blown from the hot-air nozzles 112 to be 30° C. or more and 250° C. or less. The controller 119 may not only perform the feedback control but also perform feedforward control assuming information of the medium 102a, such as thickness, physical properties, and coating amount of ink.

As described above, if the drum heater 113 includes a plurality of temperature detection sensors 118, the controller 119 can separately control a plurality of hot-air nozzles 112 to control the temperature of the drum heater 113 detected at each of the temperature detection sensors 118 and the temperature difference of hot air blown from the hot-air nozzles 112 to be substantially equal to each other to reduce unevenness of the temperature over the drum heater 113.

A number of the temperature detector (temperature detection sensor 118) may be at least one (see FIG. 24). However, the drum heater 113 preferably includes three or more temperature detection sensors 118 along an axial direction of the drum heater 113 to measure the temperature at both ends and the center of the drum heater as illustrated in FIG. 26. The cooler 120 cools the drum heater using the cooling water.

Thus, unevenness of the temperature may occur at the end portion and the center portion of the drum heater 113. Preferably, the controller 119 individually controls the hot-air nozzles 112 in the axial direction of the drum heater 113 to have a gradient in the temperature of the hot air from the hot-air nozzles 112. Thus, unevenness of the temperature at both ends and the center of the drum heater 113 along the axial direction of the drum heater 113 can be reduced.

[Opening Width of Hot-Air Nozzles]

An opening width of each of the hot-air nozzles 112 facing the drum heater 113 is determined as described below. As illustrated in FIG. 31, the opening width of the hot-air nozzle 112 is desirably 5 mm or more and 20 mm or less. It is because if the nozzle width is too narrow, the drying quality deteriorates, and if the nozzle width is too wide, wrinkles may be formed on a surface of the medium 102a. Thus, it is recommended that the opening width of the hot-air nozzles is 5 mm or more and 20 mm or less and is desirably 6 mm (see Example 26 in FIG. 31).

[Wind Speed of Hot-Air Nozzles]

In the hot-air nozzles 112 in the present disclosure, the wind speed of the hot-air nozzles 112 facing the drum heater 113 is set to 20 m/s or more and 50 m/s or less. The wind speed as described-above is to compatibly reduce the wrinkles in the medium 102a and improve the dry quality. When the wind speed is low, a satisfactory drying quality cannot be obtained. If the wind speed is too high, the wrinkles may be easily formed on the medium 102a. The wind speed is desirably to be 40 m/s (see Example 29 in FIG. 31).

[Gap Between Nozzle and Drum]

A gap between a leading end of the hot-air nozzle 112 and a surface of the drum heater is desirably 5 mm or more and 30 mm or less. Particularly, the gap is smaller, the drying efficiency is larger. When the gap is large, the drying quality tends to be poor. However, an effect of reducing the wrinkles is enhanced. It is recommended the gap is preferably 10 mm (see Example 33 in FIG. 31).

[Arrangement of Nozzles in Conveyance Direction]

Figure 29A:
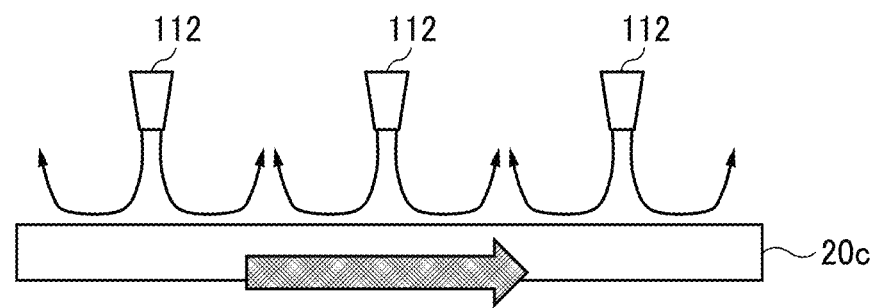
FIGS. 29A and 29B are a schematic side views of an example and a comparative example of hot-air nozzles and a film according to the present disclosure.
Figure 29B:
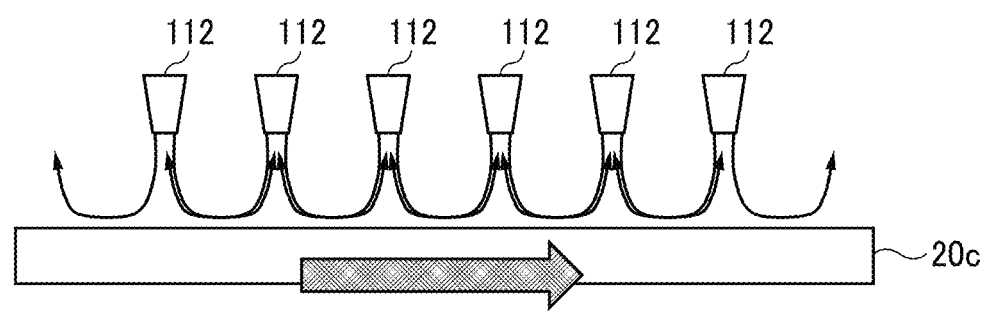
Figure 30:
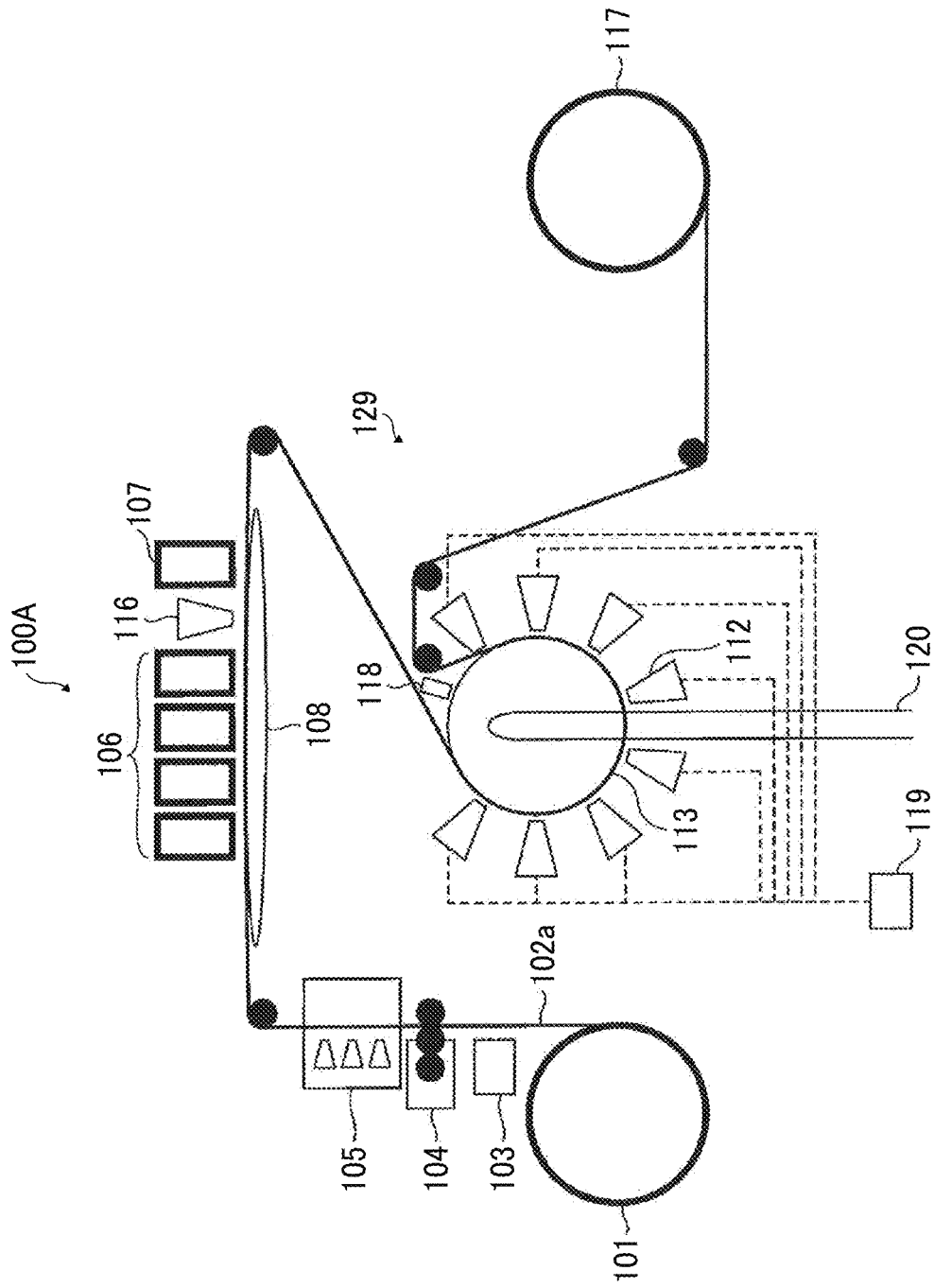
FIG. 30 is a schematic side view of still another example of the inkjet recording apparatus according to the present disclosure.

FIGS. 29A and 29B are side views of the hot-air nozzles 112 and a film 20c. FIGS. 29A and 29B illustrate an arrangement of the hot-air nozzles 112 in a conveyance direction of the film 20c. An interval of the hot-air nozzles 112 facing the drum heater 113 in the conveyance direction is set to 30 mm or more and 200 mm or less to increase drying efficiency and prevent occurrence of wrinkles in the film 20c. The film 20c is an example of the impermeable base material 102 and the medium 102a. As illustrated in FIG. 29A, the drying efficiency decreases as the interval of the hot-air nozzles 112 in the conveyance direction of the film 20c increases. However, the occurrence of wrinkles can be reduced by increasing the interval of the hot-air nozzles 112. Conversely, as illustrated in FIG. 29B, the drying efficiency increases as the interval of the hot-air nozzles 112 in the conveyance direction decreases. However, wrinkles are more likely to occur in the film 20c. The reason why the interval of the hot-air nozzles 112 is set to 30 mm at the minimum in the present disclosure is that if the nozzle width is minimum 5 mm, the size of a nozzle body is considered to be about 10 mm at minimum.

The nozzle body is a body of the hot-air nozzles 112. Thus, considering a spread of the hot-air discharged from the hot-air nozzles 112 to surroundings, it is necessary to provide the interval of about 10 mm on both sides of the hot-air nozzles 112. Further, considering an occurrence of airflow accompanying the conveyance of the film 20c, it is desirable to set the interval of 30 mm. If the interval is less than 30 mm, the hot air discharged from the hot-air nozzle 112 and bounced at the film 20c overlaps with the hot air discharged from the adjacent hot-air nozzle 112 that causes disturbance of an air current. The disturbance of the air current leads to fluttering and wrinkling of the film 20c.

Examples 24 to 45 and Comparative Example 7

Hereinafter, the present disclosure is described with reference to examples and comparative examples. However, the present disclosure is not limited to the examples as described above. The conditions corresponding to Examples 24 to 45 and Comparative Example 7 are as illustrated in FIG. 31.

Figure 28:
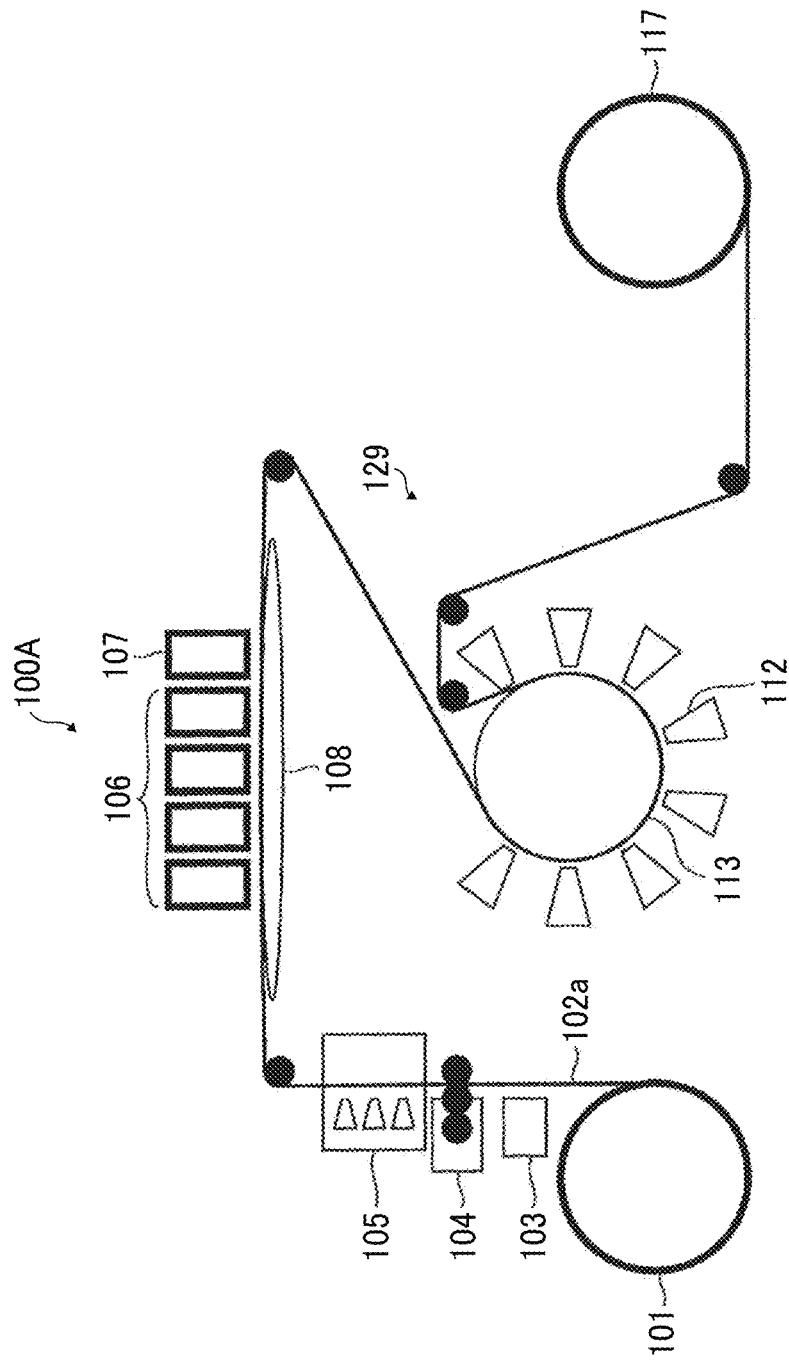
FIG. 28 is a schematic side view of an inkjet recording apparatus of a comparative example.

The aqueous inks of black, cyan, magenta, yellow, and white thus prepared were filled in ink containers of inkjet recording apparatuses (modified machine of VC-60000 available from Ricoh Company, Ltd.), and printing on an impermeable film was carried out. The ink jet recording apparatus was modified to have a configuration as illustrated in FIGS. 23, 27, and 28. Continuous printing was carried out under the following printing conditions using the modified machine of the inkjet recording apparatus. The printing conditions in each Example and Comparative example are illustrated below with reference also to FIG. 31.

[Printing Conditions]

Printing speed: 50 m/min

Resolution: 1200×1200 dpi

Printed image: a solid image of white ink was formed to overlap a solid image of black, cyan, magenta, and yellow.

Impermeable base material: OPP 20 μm film (PYLEN P2161 available from Toyobo Co., Ltd.)

Corona processing apparatus: discharge amount of corona is 20 W·min/m².

Pre-coating device: a coating roller.

Inkjet head: inkjet heads corresponding to inks of colors of black, cyan, magenta, yellow, and white.

Micro-drive condition in the nozzle not discharging liquid (vibrating condition of the ink interface in the nozzle): 2 kHz (output of 20% with respect to piezoelectric voltage at discharge).

Dryer immediately after application of pre-coating liquid: hot-air drying (temperature of hot air is 80° C. and wind speed is 20 m/s).

Dryer after printing: hot air and drum heater (see FIG. 31 for temperature of hot air and drum heater 113).

(1) Drum heater: temperature from 70° C. to 100° C. when the cooler 120 is ON, equivalent to when the hot air is OFF.

(2) Hot-air drying: temperature from 100° C. to 350° C., and wind speed is 2 to 60 m/s

[Evaluation]

After the printing of Examples 24 to 45 and Comparative Examples 7 as illustrated in FIG. 31, film quality and drying quality of printed matter were evaluated according to the following evaluation criteria.

[Evaluation Criteria of Film Quality]

The film quality of the printed image at the end of printing was visually observed and observed with a loupe and evaluated according to the following criteria. There are following four evaluation criteria from A to D.

A: No abnormality is observed in a printed image.

B: Wrinkles can be observed on the film with a magnifying glass although the wrinkles cannot be visually observed.

C: Wrinkles can be observed on a part of the printed image with naked eyes.

D: Wrinkles can be observed visually on the entire printed image.

[Dry Quality]

The drying quality of the printed image at the end of printing was evaluated by rubbing the printed image with a nonwoven fabric while the nonwoven fabric is in contact with the printed image. The drying quality was evaluated according to the following criteria. The evaluation results are summarized in FIG. 31. There are following four evaluation criteria from A to D.

A: No abnormality is observed in a printed image.

B: Although abnormality cannot be visually observed, scratches on a printed image can be observed with a magnifying glass.

C: Peeling can be observed on a part of a printed image by visual observation.

D: Peeling of an entire printed image can be visually observed.

[Evaluation Results]

The evaluation results are summarized in FIG. 31. The evaluation results of A and B in the above evaluation criteria was obtained for Examples 24 to 45. Conversely, in Comparative Examples 7, the evaluations of A, C, and D in the above evaluation criteria were obtained. From the above, application of the technique according to the present disclosure within practically usable ranges as in Examples 24 to 45 can increase the film quality and the drying quality.

Numerous additional modifications and variations are possible in light of the above teachings. Such modifications and variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A dryer comprising:
    a conveyor to convey a film including a first surface onto which a liquid is applied;
    a noncontact heater to heat the first surface of the film conveyed by the conveyor without contacting the first surface;
    a contact heater to contact and heat a second surface of the film opposite the first surface; and
    circuitry to:
    set a first heating temperature of the contact heater less than 85° C.; and
    set a second heating temperature of the noncontact heater to be 30° C. to 90° C. higher than the first heating temperature.

2. The dryer according to claim 1,
    wherein the circuitry sets the second heating temperature of the noncontact heater to be 140° C. or more and 160° C. or less.

3. The dryer according to claim 1,
    wherein the circuitry sets the first heating temperature to be 70° C. or more and less than 85° C.

4. The dryer according to claim 1, wherein the liquid is aqueous liquid.

5. The dryer according to claim 1,
    wherein the contact heater includes a cylindrical member around which the film is wound.

6. The dryer according to claim 5, further comprising a temperature sensor to detect temperature of a portion of a cylindrical surface of the cylindrical member to which the film is not wound.

7. The dryer according to claim 1, wherein the film is made of oriented polypropylene as a material.

8. A liquid application apparatus comprising the dryer according to claim 1.

9. A drying method comprising:
    conveying a film including a first surface onto which a liquid is applied;
    heating the first surface of the film without contacting the first surface;
    contacting and heating a second surface of the film opposite the first surface;
    setting a first heating temperature to heat the second surface of the film to be less than 85° C.; and
    setting a second heating temperature to heat the first surface of the film to be 30° C. to 90° C. higher than the first heating temperature.

10. The drying method according to claim 9,
    wherein the setting the second heating temperature sets the second heating temperature to 140° C. or more and 160° C. or less.

11. An inkjet recording apparatus comprising:
    a conveyor to convey a film in a conveyance direction;
    a first application device to apply a color ink onto a film conveyed by the conveyor;
    a second application device to apply a white ink onto the film to which the color ink is applied by the first application device;
    a first dryer including a drum and a plurality of nozzles facing the drum to discharge hot air from the plurality of nozzles onto the film wound around the drum;
    a second dryer disposed upstream of the first dryer in the conveyance direction, the second dryer including a plurality of nozzles not facing a drum to discharge hot air from the plurality of nozzles onto the film; and circuitry to set a first temperature of the hot air discharged from the plurality of nozzles of the first dryer to be higher than a second temperature of the hot air discharged from the plurality of nozzles of the second dryer.

12. The inkjet recording apparatus according to claim 11, wherein the second dryer includes the plurality of nozzles and a plurality of infrared heaters, and
the plurality of nozzles and the plurality of infrared heaters are alternately arranged.

13. The inkjet recording apparatus according to claim 11, wherein a dryer to heat the film is not disposed between the first application device and the second application device, and
an amount of solvent contained in the white ink is smaller than an amount of solvent contained in the color ink.

14. The inkjet recording apparatus according to claim 11, further including a pre-coating liquid application device to apply a pre-coating liquid including at least nonionic aqueous emulsion onto the film.

15. The inkjet recording apparatus according to claim 11, wherein a surface temperature of the drum is variable, and
the circuitry sets the first temperature of the hot air discharged from the plurality of nozzles of the first dryer to be 30° C. to 90° C. higher than the surface temperature of the drum.

16. The inkjet recording apparatus according to claim 11, wherein a surface temperature of the drum is variable, and
the drum includes:
a temperature detection sensor to detect surface temperature of the drum; and
a cooler to adjust the surface temperature of the drum.

17. The inkjet recording apparatus according to claim 16, wherein an opening width of the plurality of nozzles is 5 mm or more and 20 mm or less,
the circuitry maintains temperature difference between the surface temperature of the drum and the hot air discharged from the plurality of nozzles of the first dryer to be 30° C. or more and 250° C. or less, and
a wind speed of the hot air discharged from the plurality of nozzles of the first dryer is set to 20 m/s or more and 50 m/s or less.

18. The inkjet recording apparatus according to claim 11, wherein the drum includes a temperature detection sensor to detect surface temperature of the drum, and
the circuitry controls the first temperature according to the surface temperature detected by the temperature detection sensor.

19. The inkjet recording apparatus according to claim 11, wherein the drum includes a plurality of temperature detection sensors to detect surface temperature of the drum, and
the circuitry controls the first temperature according to the surface temperature detected by the plurality of temperature detection sensors.

20. The inkjet recording apparatus according to claim 11, wherein a gap between a leading end of the plurality of nozzles and a surface of the drum is 5 mm or more and 30 mm or less, and
an interval of the plurality of nozzles facing the drum in the conveyance direction is 30 mm or more and 200 mm or less.

* * * * *